US012406622B2

(12) United States Patent
Cong et al.

(10) Patent No.: US 12,406,622 B2
(45) Date of Patent: Sep. 2, 2025

(54) PIXEL DRIVING CIRCUIT AND DRIVING METHOD THEREOF, DISPLAY PANEL, AND DISPLAY APPARATUS

(71) Applicants: BEIJING BOE DISPLAY TECHNOLOGY CO., LTD., Beijing (CN); BOE TECHNOLOGY GROUP CO., LTD., Beijing (CN)

(72) Inventors: Ning Cong, Beijing (CN); Li Xiao, Beijing (CN); Haoliang Zheng, Beijing (CN); Can Zhang, Beijing (CN); Minghua Xuan, Beijing (CN); Xiaochuan Chen, Beijing (CN); Can Wang, Beijing (CN); Jinfei Niu, Beijing (CN); Jingjing Zhang, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/263,043

(22) PCT Filed: Jul. 21, 2022

(86) PCT No.: PCT/CN2022/107194

§ 371 (c)(1),
(2) Date: Jul. 26, 2023

(87) PCT Pub. No.: WO2024/016284

PCT Pub. Date: Jan. 25, 2024

(65) Prior Publication Data

US 2025/0014514 A1 Jan. 9, 2025

(51) Int. Cl.
*G09G 3/3233* (2016.01)
*G09G 3/32* (2016.01)

(52) U.S. Cl.
CPC ............. *G09G 3/3233* (2013.01); *G09G 3/32* (2013.01); *G09G 2300/0842* (2013.01);
(Continued)

(58) Field of Classification Search
CPC ................... G09G 3/3233; G09G 3/32; G09G 2300/0842; G09G 2300/0852;
(Continued)

(56) References Cited

U.S. PATENT DOCUMENTS

| | | | | |
|---|---|---|---|---|
| 9,786,224 | B2 * | 10/2017 | Kim | G09G 3/3258 |
| 10,056,033 | B2 * | 8/2018 | Han | H10K 59/1216 |

(Continued)

FOREIGN PATENT DOCUMENTS

| | | | |
|---|---|---|---|
| CN | 107564473 | A | 1/2018 |
| CN | 108538245 | A | 9/2018 |

(Continued)

OTHER PUBLICATIONS

Ex Parte Quyale Action on the U.S. Appl. No. 17/620,398 issued by the USPTO on Dec. 6, 2022.

(Continued)

*Primary Examiner* — Jeff Piziali
(74) *Attorney, Agent, or Firm* — XSENSUS LLP

(57) ABSTRACT

A pixel driving circuit includes a driving sub-circuit and a control sub-circuit. The driving sub-circuit is coupled to a data signal terminal, a scan signal terminal, a first power supply voltage terminal, an enable signal control terminal and an element to be driven, and the driving sub-circuit is configured to, in response to an enable signal, transmit a generated driving signal to the element to be driven, and control a current path transmitting the driving signal to be turned on and off. The control sub-circuit is coupled to the enable signal control terminal, and the control sub-circuit is configured to, in response to a signal received at the control (Continued)

signal terminal, transmit a signal received at a first enable signal terminal or a signal received at a second enable signal terminal to the enable signal control terminal.

19 Claims, 20 Drawing Sheets

(52) U.S. Cl.
CPC ............... *G09G 2300/0852* (2013.01); *G09G 2300/0861* (2013.01); *G09G 2310/027* (2013.01); *G09G 2310/0286* (2013.01); *G09G 2310/062* (2013.01); *G09G 2310/08* (2013.01); *G09G 2320/0233* (2013.01); *G09G 2330/02* (2013.01); *G09G 2330/021* (2013.01)

(58) Field of Classification Search
CPC ..... G09G 2300/0861; G09G 2310/027; G09G 2310/0286; G09G 2310/062; G09G 2310/08; G09G 2320/0233; G09G 2330/02; G09G 2330/021; G09G 3/28
See application file for complete search history.

(56) References Cited

U.S. PATENT DOCUMENTS

| | | | | |
|---|---|---|---|---|
| 10,170,054 | B2 * | 1/2019 | Park | G09G 3/3275 |
| 10,198,995 | B1 * | 2/2019 | Chen | G09G 3/3266 |
| 10,297,781 | B2 * | 5/2019 | Yoon | H10K 10/46 |
| 10,388,219 | B2 * | 8/2019 | Lee | G09G 3/3225 |
| 10,481,730 | B2 * | 11/2019 | Yang | H10K 59/40 |
| 10,490,126 | B2 * | 11/2019 | Li | G09G 3/3291 |
| 10,522,079 | B2 * | 12/2019 | Chen | G09G 3/3233 |
| 10,643,531 | B2 * | 5/2020 | Li | G09G 3/3233 |
| 10,672,338 | B2 * | 6/2020 | Lin | H10K 59/124 |
| 10,762,841 | B2 * | 9/2020 | Ji | G09G 3/3233 |
| 10,777,138 | B2 * | 9/2020 | Ji | G09G 3/3233 |
| 10,825,399 | B2 * | 11/2020 | Chen | G09G 3/3291 |
| 10,861,386 | B2 * | 12/2020 | Park | G09G 3/3266 |
| 10,971,067 | B1 * | 4/2021 | Kawashima | G09G 3/3258 |
| 11,004,388 | B2 * | 5/2021 | Li | G09G 3/3258 |
| 11,081,053 | B2 * | 8/2021 | Jin | G09G 3/3266 |
| 11,158,256 | B2 * | 10/2021 | Lin | G09G 3/3233 |
| 11,244,618 | B2 * | 2/2022 | Wen | G09G 3/3266 |
| 11,328,678 | B2 * | 5/2022 | Chen | G09G 3/3291 |
| 11,532,282 | B2 * | 12/2022 | Ono | G09G 3/3266 |
| 11,694,618 | B2 * | 7/2023 | Xue | G09G 3/3258 345/76 |
| 11,854,470 | B2 * | 12/2023 | Kim | G09G 3/32 |
| 12,106,691 | B2 | 10/2024 | Yamada | |
| 12,154,501 | B2 * | 11/2024 | Chen | G09G 3/32 |
| 12,154,515 | B2 * | 11/2024 | Ono | G09G 3/3233 |
| 2011/0164016 | A1 | 7/2011 | Kang et al. | |
| 2014/0320544 | A1 | 10/2014 | Kim | |
| 2016/0063922 | A1 | 3/2016 | Tsai et al. | |
| 2018/0096651 | A1 | 4/2018 | Yamashita et al. | |
| 2018/0315374 | A1 | 11/2018 | Zhang et al. | |
| 2019/0326751 | A1 | 10/2019 | Xi | |
| 2019/0347987 | A1 | 11/2019 | Zhao et al. | |
| 2020/0265786 | A1 | 8/2020 | Li | |
| 2020/0273410 | A1 | 8/2020 | Yu et al. | |
| 2021/0125543 | A1 | 4/2021 | Kim et al. | |
| 2021/0167161 | A1 | 6/2021 | Yang et al. | |
| 2021/0366386 | A1 | 11/2021 | Gao | |
| 2021/0407376 | A1 | 12/2021 | Yue et al. | |
| 2022/0148493 | A1 | 5/2022 | Xuan et al. | |
| 2022/0157247 | A1 | 5/2022 | Yue et al. | |
| 2022/0309991 | A1 | 9/2022 | Yuan et al. | |
| 2022/0310011 | A1 | 9/2022 | Chen et al. | |
| 2022/0351683 | A1 | 11/2022 | Xiao et al. | |
| 2023/0042966 | A1 | 2/2023 | Huangfu et al. | |
| 2023/0186826 | A1 | 6/2023 | Hong et al. | |
| 2023/0214037 | A1 | 7/2023 | Hwang | |

FOREIGN PATENT DOCUMENTS

| | | | |
|---|---|---|---|
| CN | 109064972 | A | 12/2018 |
| CN | 110021264 | A | 7/2019 |
| CN | 110021273 | A | 7/2019 |
| CN | 110930930 | A | 3/2020 |
| CN | 111179849 | A | 5/2020 |
| CN | 111223444 | A | 6/2020 |
| CN | 111312158 | A | 6/2020 |
| CN | 111354314 | A | 6/2020 |
| CN | 111462679 | A | 7/2020 |
| CN | 111477163 | A | 7/2020 |
| CN | 111583873 | A | 8/2020 |
| CN | 111627387 | A | 9/2020 |
| CN | 112802431 | A | 5/2021 |
| CN | 113012634 | A | 6/2021 |
| CN | 113053301 | A | 6/2021 |
| CN | 113724653 | A | 11/2021 |
| CN | 114078441 | A | 2/2022 |
| KR | 20150083371 | A | 7/2015 |
| TW | 201944385 | A | 11/2019 |
| WO | 2022094738 | A1 | 5/2022 |

OTHER PUBLICATIONS

Notice of Allowance on the U.S. Appl. No. 17/620,398 issued by the USPTO on Mar. 3, 2023.
Ex Parte Quyale Action on the U.S. Appl. No. 18/308,385 issued by the USPTO on Jan. 24, 2024.
Office Action on the Chinese Patent Application No. 202080002627.4 issued by the Chinese Patent Office on Dec. 26, 2022.
International Search Report and Written Opinion on the International Patent Application No. PCT/CN2020/126034 issued by the International Searching Authority on Jul. 26, 2021.
International Search Report and Written Opinion on the International Patent Application No. PCT/CN2023/085048 issued by the International Searching Authority on Jul. 11, 2023.
Office Action on the Taiwanese Patent Application No. 110135545 issued by the Taiwanese Patent Office on Jun. 14, 2022.
Extended European Search Report on the European Patent Application No. 20960201.0 issued by the European Paten Office on Apr. 21, 2023.
Non-Final Rejection issued Jul. 8, 2025 in U.S. Appl. No. 18/824,517, total 10 pages.
Notice of Allowance issued Jul. 2, 2025 in U.S. Appl. No. 18/938,338, total 8 pages.

* cited by examiner

PIXEL DRIVING CIRCUIT AND DRIVING METHOD THEREOF, DISPLAY PANEL, AND DISPLAY APPARATUS

CROSS-REFERENCE TO RELATED APPLICATION

This application is a national phase entry under 35 USC 371 of International Patent Application No. PCT/CN2022/107194, filed on Jul. 21, 2022, which is incorporated herein by reference in its entirety.

TECHNICAL FIELD

The present disclosure relates to the field of display technologies, and in particular, to a pixel driving circuit and a driving method thereof, a display panel and a display apparatus.

BACKGROUND

A mini light-emitting diode (Mini LED, also referred to as sub-millimeter light-emitting diode) display apparatus or a micro light-emitting diode (Micro LED) display apparatus is a display apparatus in which mini LEDs or micro LEDs serve as light-emitting elements. Compared with a traditional LED, a size of the mini LED is between 100 μm and 300 μm, and a size of the micro LED is below 100 μm.

Mini LED display apparatuses and Micro LED display apparatuses may achieve higher contrast, pictures having more levels, and picture effects being close to reality, and thus have very broad market prospects in future.

SUMMARY

In an aspect, a pixel driving circuit includes a driving sub-circuit and a control sub-circuit. The driving sub-circuit is coupled to a data signal terminal, a scan signal terminal, a first power supply voltage terminal, an enable signal control terminal and an element to be driven, and the driving sub-circuit is configured to, in response to a signal received at the scan signal terminal, write a data signal received at the data signal terminal into the driving sub-circuit.

The driving sub-circuit is further configured to, generate a driving signal according to the written data signal and a first voltage signal received at the first power supply voltage terminal, and in response to an enable signal received at the enable signal control terminal, transmit the driving signal to the element to be driven, and control a current path transmitting the driving signal to be turned on and off.

The control sub-circuit is coupled to a control signal terminal, a first enable signal terminal, a second enable signal terminal and the enable signal control terminal, and the control sub-circuit is configured to, in response to a signal received at the control signal terminal, transmit a signal received at the first enable signal terminal to the enable signal control terminal, or transmit a signal received at the second enable signal terminal to the enable signal control terminal.

The control sub-circuit is coupled to a control signal terminal, a first enable signal terminal, a second enable signal terminal and the enable signal control terminal, and the control sub-circuit is configured to, in response to a signal received at the control signal terminal, transmit a signal received at the first enable signal terminal to the enable signal control terminal, or transmit a signal received at the second enable signal terminal to the enable signal control terminal.

In some embodiments, the driving sub-circuit includes a data writing sub-circuit and a driving signal generating sub-circuit. The data writing sub-circuit is coupled to the data signal terminal, the scan signal terminal and a second node, and the data writing sub-circuit is configured to, in response to a scan signal received at the scan signal terminal, transmit the data signal received at the data signal terminal to the second node. The driving signal generating sub-circuit is coupled to the second node, the first power supply voltage terminal, the enable signal control terminal and the element to be driven, and the driving signal generating sub-circuit is configured to, in response to the enable signal received at the enable signal control terminal, generate the driving signal according to a voltage at the second node and the first voltage signal received at the first power supply voltage terminal; and the driving signal generating sub-circuit is further configured to, in response to the enable signal received at the enable signal control terminal, control a current path through which the driving signal is transmitted to the element to be driven to be turned on and off.

In some embodiments, the driving signal generating sub-circuit includes a driving transistor and an enable transistor. A first electrode of the driving transistor is coupled to the first power supply voltage terminal, a second electrode of the driving transistor is coupled to a first node, and a control electrode of the driving transistor is coupled to the second node; a first electrode of the enable transistor is coupled to the first node, a second electrode of the enable transistor is coupled to a third node, and a control electrode of the enable transistor is coupled to the enable signal control terminal; and the third node is further coupled to a first electrode of the element to be driven, and a second electrode of the element to be driven is coupled to a second power supply voltage terminal.

In some embodiments, the data writing sub-circuit includes: a writing transistor, a first capacitor and a first reset transistor. A first electrode of the writing transistor is coupled to the data signal terminal, a second electrode of the writing transistor is coupled to the second node, and a control electrode of the writing transistor is coupled to the scan signal terminal; a first electrode of the first reset transistor is coupled to a first node, a second electrode of the first reset transistor is coupled to a reset signal terminal, and a control electrode of the first reset transistor is coupled to the scan signal terminal; and a first electrode of the first capacitor is coupled to the first node, and a second electrode of the first capacitor is coupled to the second node.

In some embodiments, the data writing sub-circuit includes: a first transmission transistor, a second transmission transistor and a first capacitor, and the scan signal terminal includes a first scan signal terminal and a second scan signal terminal. A first electrode of the first transmission transistor is coupled to the data signal terminal, a second electrode of the first transmission transistor is coupled to the second node, and a control electrode of the first transmission transistor is coupled to the first scan signal terminal; a first electrode of the second transmission transistor is coupled to the data signal terminal, a second electrode of the second transmission transistor is coupled to the second node, and a control electrode of the second transmission transistor is coupled to the second scan signal terminal; and a first electrode of the first capacitor is coupled to the second node, and a second electrode of the first capacitor is coupled to a reference voltage terminal.

In some embodiments, the pixel driving circuit further comprises a reset sub-circuit coupled to a third node, the scan signal terminal and a reset signal terminal. The reset sub-circuit is configured to, in response to the scan signal received at the scan signal terminal, transmit a reset signal received at the reset signal terminal to the third node.

In some embodiments, the reset sub-circuit includes a second reset transistor; a first electrode of the second reset transistor is coupled to the third node, a second electrode of the second reset transistor is coupled to the reset signal terminal, and a control electrode of the second reset transistor is coupled to the scan signal terminal.

In some embodiments, the control sub-circuit includes a first enable sub-circuit and a second enable sub-circuit. The first enable sub-circuit is coupled to a fourth node, the first enable signal terminal and the enable signal control terminal, and the first enable sub-circuit is configured to, in response to a first control signal received at the fourth node, transmit a first enable signal received at the first enable signal terminal to the enable signal control terminal.

The second enable sub-circuit is coupled to a fifth node, the second enable signal terminal and the enable signal control terminal, and the second enable sub-circuit is configured to, in response to a second control signal received at the fifth node, transmit a second enable signal received at the second enable signal terminal to the enable signal control terminal.

In some embodiments, the first enable sub-circuit includes a first control transistor; a first electrode of the first control transistor is coupled to the first enable signal terminal, a second electrode of the first control transistor is coupled to the enable signal control terminal, and a control electrode of the first control transistor is coupled to the fourth node.

The second enable sub-circuit includes a second control transistor; a first electrode of the second control transistor is coupled to the second enable signal terminal, a second electrode of the second control transistor is coupled to the enable signal control terminal, and a control electrode of the second control transistor is coupled to the fifth node.

In some embodiments, transistors included in the first enable sub-circuit and the second enable sub-circuit are of a same conduction type.

The control sub-circuit further includes a first enable control sub-circuit and a second enable control sub-circuit, and the control signal terminal includes a first control signal terminal and a second control signal terminal.

The first enable control sub-circuit is coupled to the fourth node, the first control signal terminal and a first control data signal terminal, and the first enable control sub-circuit is configured to, in response to a first control gate signal received at the first control signal terminal, transmit a signal received at the first control data signal terminal to the fourth node.

The second enable control sub-circuit is coupled to the fifth node, the second control signal terminal and a second control data signal terminal, and the second enable control sub-circuit is configured to, in response to a second control gate signal received at the second control signal terminal, transmit a signal received at the second control data signal terminal to the fifth node.

In some embodiments, the first enable control sub-circuit includes a first enable control transistor and a second capacitor; a first electrode of the first enable control transistor is coupled to the first control data signal terminal, a second electrode of the first enable control transistor is coupled to the fourth node, and a control electrode of the first enable control transistor is coupled to the first control signal terminal. A first electrode of the second capacitor is coupled to the fourth node, and a second electrode of the second capacitor is coupled to a first voltage signal terminal.

The second enable control sub-circuit includes a second enable control transistor and a third capacitor; a first electrode of the second enable control transistor is coupled to the second control data signal terminal, a second electrode of the second enable control transistor is coupled to the fifth node, and a control electrode of the second enable control transistor is coupled to the second control signal terminal.

A first electrode of the third capacitor is coupled to the fifth node, and a second electrode of the third capacitor is coupled to a second voltage signal terminal.

In some embodiments, transistors included in the first enable sub-circuit and the second enable sub-circuit are of opposite conduction types. The control sub-circuit further includes an enable control sub-circuit and a signal latch circuit; the control signal terminal is a control gate signal terminal. The enable control sub-circuit is coupled to the control gate signal terminal, a control data signal terminal and the fifth node, and the enable control sub-circuit is configured to, in response to a control gate signal received at the control gate signal terminal, transmit a control data signal received at the control data signal terminal to the fifth node. The signal latch circuit is coupled to the fourth node and the fifth node, and the signal latch circuit is configured to transmit the control data signal received at the control data signal terminal to the fourth nodes.

In some embodiments, the enable control sub-circuit includes an enable control transistor; a first electrode of the enable control transistor is coupled to the control data signal terminal, a second electrode of the enable control transistor is coupled to the fifth node and the signal latch circuit, and a control electrode of the enable control transistor is coupled to the control gate signal terminal.

In some embodiments, the signal latch circuit includes a fourth capacitor, a first electrode of the fourth capacitor is coupled to the fourth node and the fifth node, and a second electrode of the fourth capacitor is coupled to a third voltage signal terminal.

Alternatively, the signal latch circuit includes: a first latch transistor, a second latch transistor, a third latch transistor and a fourth latch transistor; conduction types of the first latch transistor and the fourth latch transistor are opposite to conduction types of the second latch transistor and the third latch transistor.

A first electrode of the first latch transistor is coupled to a fourth voltage signal terminal, a second electrode of the first latch transistor is coupled to the fifth node, and a control electrode of the first latch transistor is coupled to the fourth node.

A first electrode of the second latch transistor is coupled to the fifth node, a second electrode of the second latch transistor is coupled to a first electrode of the third latch transistor, and a control electrode of the second latch transistor is coupled to the fourth node.

A second electrode of the third latch transistor is coupled to the fourth node, and a control electrode of the third latch transistor is coupled to the fifth node.

A first electrode of the fourth latch transistor is coupled to the fourth node, a second electrode of the fourth latch transistor is coupled to a fifth voltage signal terminal, and a control electrode of the fourth latch transistor is coupled to the fifth node.

In another aspect, a display panel includes the pixel driving circuit according to any one of the embodiments above and an element to be driven. The element to be driven is coupled to the pixel driving circuit.

In some embodiments, the pixel driving circuit includes the first enable control sub-circuit and the second enable control sub-circuit, the first enable control sub-circuit is coupled to the first control signal terminal and the first control data signal terminal, and the second enable control sub-circuit is coupled to the second control signal terminal and the second control data signal terminal.

The display panel further includes: a plurality of first signal lines, a plurality of second signal lines, a plurality of third signal lines and a plurality of fourth signal lines. First enable signal terminals in a row of pixel driving circuits are coupled to a first signal line in the plurality of first signal lines. Second enable signal terminals in the row of pixel driving circuits are coupled to a second signal line in the plurality of second signal lines. First control signal terminals and second control signal terminals in the row of pixel driving circuits are coupled to a third signal line in the plurality of third signal lines, or the first control signal terminals and the second control signal terminals in the row of pixel driving circuits each are coupled to a corresponding third signal line in the plurality of third signal lines. First control data signal terminals and second control data signal terminals in a column of pixel driving circuits each are coupled to a fourth signal line in the plurality of fourth signal lines.

In some embodiments, the pixel driving circuit includes the first enable control sub-circuit and the second enable control sub-circuit, the first enable control sub-circuit is coupled to the first control signal terminal and the first control data signal terminal, and the second enable control sub-circuit is coupled to the second control signal terminal and the second control data signal terminal.

The display panel further includes: a plurality of first signal lines, a plurality of second signal lines, a plurality of third signal lines and a plurality of fourth signal lines. First enable signal terminals in a row of pixel driving circuits are coupled to a first signal line in the plurality of first signal lines. Second enable signal terminals in the row of pixel driving circuits are coupled to a second signal line in the plurality of second signal lines. First control signal terminals and second control signal terminals in the row of pixel driving circuits each are coupled to a third signal line in the plurality of third signal lines. First control data signal terminals and second control data signal terminals in a column of pixel driving circuits are coupled to a fourth signal line in the plurality of fourth signal lines.

In some embodiments, the pixel driving circuit includes the enable control sub-circuit, and the enable control sub-circuit is coupled to the control gate signal terminal and the control data signal terminal.

The display panel further includes: a plurality of first signal lines, a plurality of second signal lines, a plurality of third signal lines and a plurality of fourth signal lines. First enable signal terminals in a row of pixel driving circuits are coupled to a first signal line in the plurality of first signal lines. Second enable signal terminals in the row of pixel driving circuits are coupled to a second signal line in the plurality of second signal lines. Control data signal terminals in the row of pixel driving circuits are coupled to a third signal line in the plurality of third signal lines. Control gate signal terminals in a column of pixel driving circuits are coupled to a fourth signal line in the plurality of fourth signal lines.

In yet another aspect, a display apparatus includes the display panel as described in any one of the embodiments above and a driver chip. The driver chip is coupled to the display panel, and the driver chip is configured to provide signals to the display panel.

In yet another aspect, a driving method of a pixel driving circuit is provided. The pixel driving circuit includes a driving sub-circuit and a control sub-circuit, the driving sub-circuit is coupled to an enable signal control terminal and an element to be driven, and the driving sub-circuit is configured to, in response to an enable signal received at the enable signal control terminal, transmit a generated driving signal to the element to be driven, and control a current path through which the driving signal is transmitted to the element to be driven to be turned on and off. The control sub-circuit is coupled to the enable signal control terminal, and the control sub-circuit is configured to transmit a first enable signal or a second enable signal to the enable signal control terminal.

The driving method of the pixel driving circuit is as follows.

When target luminance of the element to be driven driven by the pixel driving circuit is greater than first luminance, the control sub-circuit transmits the first enable signal to the enable signal control terminal, and the first enable signal is configured to control the current path through which the driving signal is transmitted to the element to be driven to be turned on.

When the target luminance of the element to be driven driven by the pixel driving circuit is less than the first luminance, the control sub-circuit transmits the second enable signal to the enable signal control terminal. The second enable signal is a pulse signal, and the second enable signal is configured to control the current path through which the driving signal is transmitted to the element to be driven to be turned on and off alternately.

In some embodiments, a duty ratio of the second enable signal is in a range of 0.2% to 100%, inclusive.

In yet another aspect, a computer-readable storage medium is provided. The computer-readable storage medium has stored therein computer program instructions that, when run on a computer, cause the computer to execute the driving method of the pixel driving circuit as described in any one of the embodiments above.

In yet another aspect, a computer program product is provided. The computer program product includes computer program instructions that, when run on a computer, cause the computer to execute the driving method of the pixel driving circuit as described in any one of the embodiments above.

In yet another aspect, a computer program is provided. When executed on a computer, the computer program causes the computer to execute the driving method of the pixel driving circuit as described in any one of the embodiments above.

BRIEF DESCRIPTION OF THE DRAWINGS

In order to describe technical solutions in the present disclosure more clearly, accompanying drawings to be used in some embodiments of the present disclosure will be introduced briefly below. Obviously, the accompanying drawings to be described below are merely accompanying drawings of some embodiments of the present disclosure, and a person of ordinary skill in the art can obtain other drawings according to these accompanying drawings. In addition, the accompanying drawings to be described below may be regarded as schematic diagrams, and are not limitations on actual sizes of products, actual processes of methods and actual timings of signals involved in the embodiments of the present disclosure.

DETAILED DESCRIPTION

Figure 1:
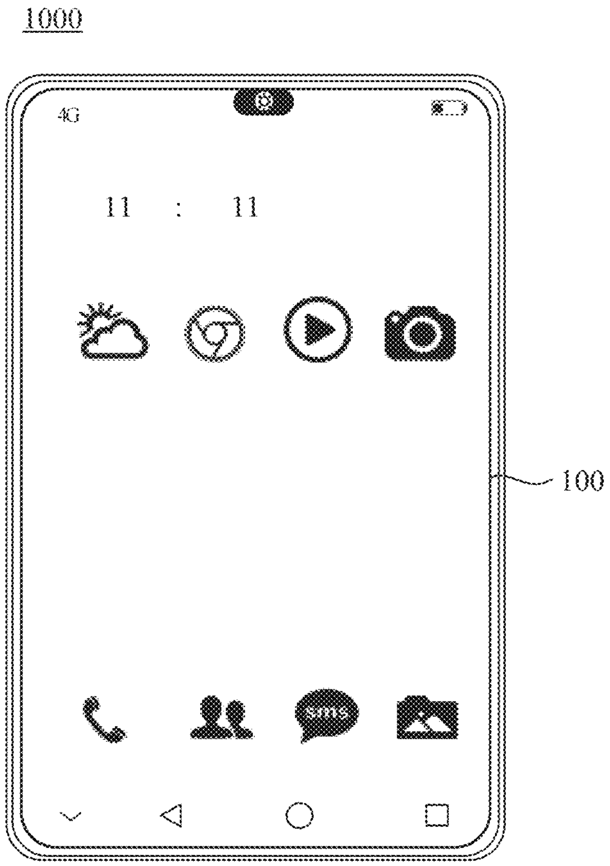
FIG. 1 is a structural diagram of a display apparatus provided in some embodiments of the present disclosure.

Technical solutions in some embodiments of the present disclosure will be described clearly and completely below with reference to the accompanying drawings. Obviously, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the description and the claims, the term "comprise" and other forms thereof such as the third-person singular form "comprises" and the present participle form "comprising" are construed as an open and inclusive meaning, i.e., "including, but not limited to". In the description of the specification, the terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials or characteristics may be included in any one or more embodiments or examples in any suitable manner.

Hereinafter, the terms such as "first" and "second" are used for descriptive purposes only, and are not to be construed as indicating or implying the relative importance or implicitly indicating the number of indicated technical features. Thus, a feature defined with "first" or "second" may explicitly or implicitly include one or more of the features. In the description of the embodiments of the present disclosure, the terms "a plurality of", "the plurality of" and "multiple" each mean two or more unless otherwise specified.

In the description of some embodiments, terms such as "coupled" and "connected" and derivatives thereof may be used. For example, the term "connected" may be used in the description of some embodiments to indicate that two or more components are in direct physical or electrical contact with each other. As another example, the term "coupled" may be used in the description of some embodiments to indicate that two or more components are in direct physical or electrical contact. However, the term "coupled" or "communicatively coupled" may also mean that two or more components are not in direct contact with each other, but still cooperate or interact with each other. The embodiments disclosed herein are not necessarily limited to the context herein.

The phrase "at least one of A, B and C" has the same meaning as the phrase "at least one of A, B or C", and they both include the following combinations of A, B and C: only A, only B, only C, a combination of A and B, a combination of A and C, a combination of B and C, and a combination of A, B and C.

The phrase "A and/or B" includes the following three combinations: only A, only B, and a combination of A and B.

As used herein, depending on the context, the term "if" is optionally construed as "when", "in a case where", "in response to determining" or "in response to detecting". Similarly, depending on the context, the phrase "if it is determined" or "if [a stated condition or event] is detected" is optionally construed as "in a case where it is determined", "in response to determining", "in a case where [the stated condition or event] is detected", or "in response to detecting [the stated condition or event]".

The phrase "applicable to" or "configured to" used herein means an open and inclusive expression, which does not exclude devices that are applicable to or configured to perform additional tasks or steps.

In addition, the phase "based on" used is meant to be open and inclusive, since a process, step, calculation or other action that is "based on" one or more of the stated conditions or values may, in practice, be based on additional conditions or value exceeding those stated.

As used herein, terms such as "about", "substantially" or "approximately" include a stated value and an average value within an acceptable range of deviation of a particular value. The acceptable range of deviation is determined by a person of ordinary skill in the art in view of the measurement in question and errors associated with the measurement of a particular quantity (i.e., the limitation of the measurement system).

As used herein, terms such as "parallel", "perpendicular" or "equal" include a stated condition and a condition similar to the stated condition. A range of the similar condition is within an acceptable range of deviation, and the acceptable range of deviation is determined by a person of ordinary skill in the art in view of the measurement in question and errors associated with the measurement of a particular quantity (i.e., the limitation of the measurement system). For example, the term "parallel" includes absolute parallelism and approximate parallelism, and an acceptable range of deviation of the approximate parallelism may be, for example, a deviation within 5°. The term "perpendicular" includes absolute perpendicularity and approximate perpendicularity, and an acceptable range of deviation of the approximate perpendicularity may also be, for example, a deviation within 5°. The term "equal" includes absolute equality and approximate equality, and an acceptable range of deviation of approximate equality may be, for example, that a difference between two equals is less than or equal to 5% of any one of the two equals.

It will be understood that, in a case where a layer or component is referred to as being on another layer or a substrate, it may be that the layer or component is directly on the another layer or substrate; or it may be that intermediate layer(s) exist between the layer or component and the another layer or substrate.

Exemplary embodiments are described herein with reference to sectional views and/or plan views as idealized exemplary drawings. In the drawings, thicknesses of layers and sizes of regions are enlarged for clarity. Variations in shape relative to the accompanying drawings due to, for example, manufacturing technologies and/or tolerances may be envisaged. Therefore, the exemplary embodiments should not be construed as being limited to the shapes of the regions shown herein, but including shape deviations due to, for example, manufacturing. For example, an etched region shown to have a rectangular shape generally has a feature of being curved. Therefore, the regions shown in the accompanying drawings are schematic in nature, and their shapes are not intended to show actual shapes of regions in an apparatus, and are not intended to limit the scope of the exemplary embodiments.

As shown in FIG. 1, some embodiments of the present disclosure provide a display apparatus 1000. The display apparatus 1000 may be, for example, a mobile phone, a tablet computer, a personal digital assistant (PDA), a television, a vehicle computer or a wearable display device (which may be, for example, a watch). A specific form of the display apparatus 1000 is not particularly limited in the embodiments of the present disclosure.

In some embodiments, the display apparatus 1000 includes a display panel 100. For example, the display panel 100 may be an electroluminescence display panel. For example, the display panel 100 may adopt self-luminescent light-emitting diodes, such as organic light-emitting diodes (OLEDs), micro organic light-emitting diode (Micro OLEDs), quantum dot light-emitting diodes (QLEDs), mini light-emitting diodes (Mini LEDs) or micro light-emitting diodes (Micro LEDs). The display panel will be introduced below by taking the mini LEDs or micro LEDs as an example.

Figure 2:
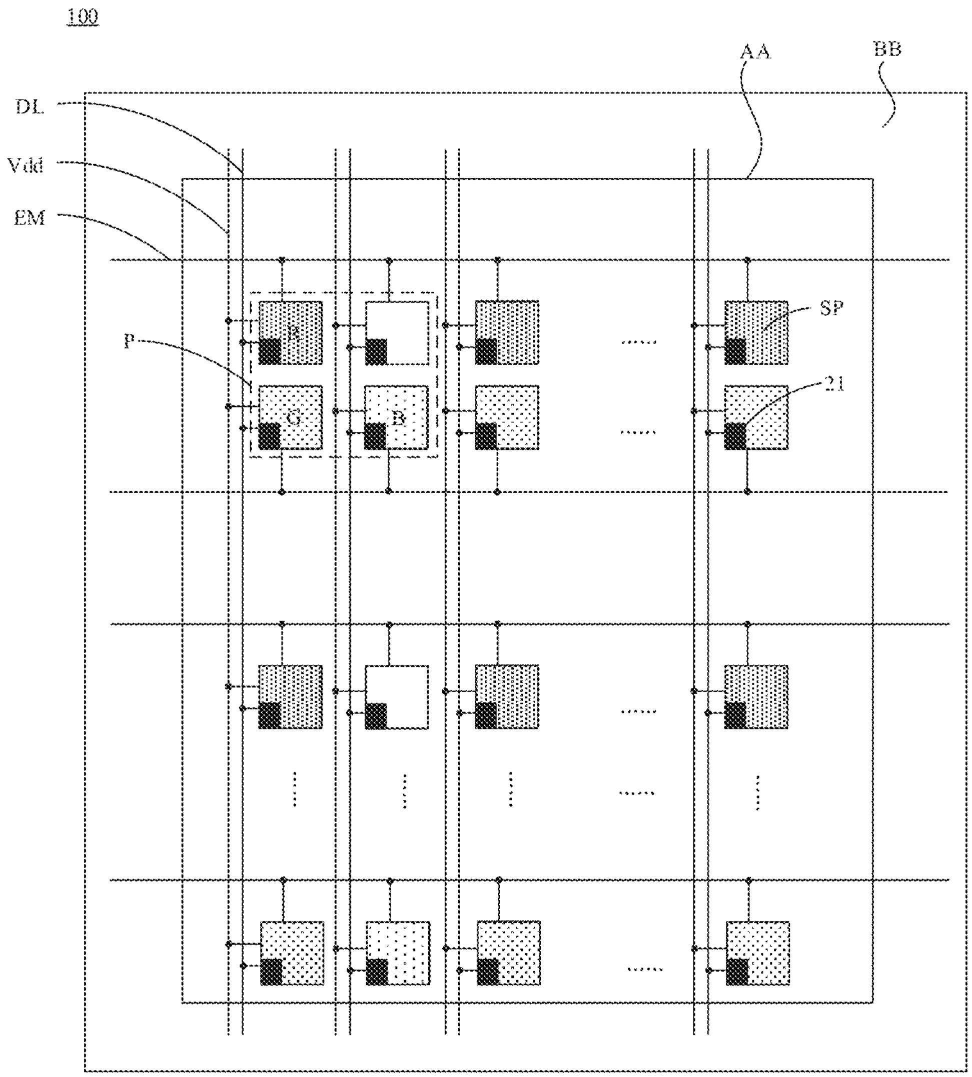
FIG. 2 is a structural diagram of a display panel provided in some embodiments of the present disclosure.

In some embodiments, as shown in FIG. 2, the display panel 100 includes a display area AA (also being referred to as an active display area) and a peripheral area BB located at at least one side of the display area AA. The display area AA is provided therein with a plurality of pixels P arranged in an array and a plurality of signal lines. Each pixel P includes multiple sub-pixels SP, and the sub-pixel SP is the smallest unit of the display panel 100 for displaying an image. Each sub-pixel SP may display a single color, such as red (R), green (G) or blue (B). Luminance (gray scale) of sub-pixels SP displaying different colors is adjusted, and colors are combined and superimposed, so that the display of colors is achieved. As a result, full-color display of the display panel 100 is achieved.

The plurality of signal lines may include, for example, data signal lines DL, first power supply voltage signal lines Vdd and enable signal lines EM. The data signal line DL is configured to transmit a data signal to sub-pixels SP; the first power supply voltage signal line Vdd is configured to transmit a first voltage signal to sub-pixels SP; and the enable signal line EM is configured to transmit an enable signal to sub-pixels SP.

In some embodiments, the sub-pixel SP includes a light-emitting device, and a pixel driving circuit for driving the light-emitting device to emit light. The light-emitting device may be an inorganic light-emitting diode. For example, the light-emitting device includes a mini light-emitting diode (Mini LED) and/or a micro light-emitting diode (Micro LED). A size of the Mini LED is greater than or equal to 100 μm and less than 300 μm, and a size of the Micro LED is less than 100 μm.

Figure 3:
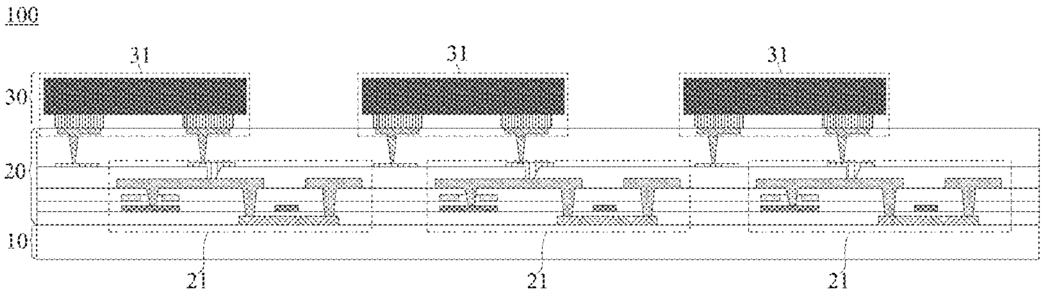
FIG. 3 is a sectional view showing a structure of a display panel provided in some embodiments of the present disclosure.

In some embodiments, as shown in FIG. 3, the display panel 100 includes: a substrate 10, a driving circuit layer 20 and a light-emitting device layer 30 that are stacked in sequence. The driving circuit layer 20 includes a plurality of pixel driving circuits 21 arranged in an array, and the light-emitting device layer 30 includes a plurality of light-emitting devices 31 arranged in an array. The plurality of pixel driving circuits 21 are coupled to the light-emitting device layer 30, and each pixel driving circuit 21 controls a corresponding light-emitting device 31 to be turned on or off, and controls the luminance of the corresponding light-emitting device 31.

In some examples, the light-emitting device layer 30 may adopt Mini LEDs or Micro LEDs. The Mini LED and the Micro LED both have advantages of high brightness, long service life and small size, and thus have great application prospects in the display field.

In some related technologies, transistors (thin film transistors, TFT) of a pixel driving circuit are fabricated on a silicon oxide substrate. The transistors fabricated on the silicon oxide substrate cannot achieve high pixel density (pixels per inch, PPI) display due to limitations of the size and stability of the transistors.

In addition, a current density received by a light-emitting device decreases at a low gray scale, and a main peak of a Mini LED or a Micro LED have a characteristic of drifting with the change of the current density. Therefore, the brightness uniformity of a display panel is poor at a low current density.

Figure 4A:
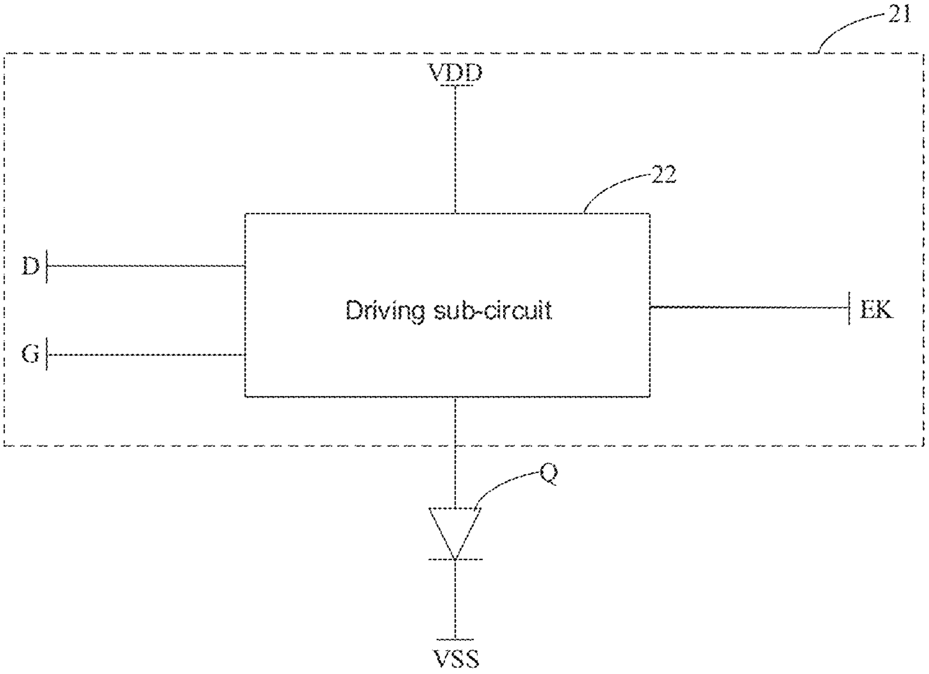
FIG. 4A is a configuration diagram of a pixel driving circuit provided in some embodiments of the present disclosure.

In light of this, in an aspect, as shown in FIG. 4A, the pixel driving circuit 21 is provided in some embodiments of the present disclosure. The pixel driving circuit 21 includes a driving sub-circuit 22. The driving sub-circuit 22 is coupled to a data signal terminal D, a scan signal terminal G, a first power supply voltage terminal VDD, an enable signal control terminal EK and an element Q to be driven. The driving sub-circuit 22 is configured to, in response to a signal received at the scan signal terminal G, write a data signal received at the data signal terminal D into the driving sub-circuit 22.

In addition, the driving sub-circuit 22 is further configured to, generate a driving signal according to the written data signal and a first voltage signal received at the first power supply voltage terminal VDD, and in response to an enable signal received at the enable signal control terminal EK, transmit the driving signal to the element to be driven, and control a current path transmitting the driving signal to be turned on and off.

In some examples, the driving sub-circuit 22 is coupled to the element Q to be driven. The element Q to be driven may be the light-emitting device. For example, the element Q to be driven may be a Mini LED or a Micro LED.

The driving sub-circuit 22 is coupled to the data signal terminal D and the first power supply voltage terminal VDD, and the driving sub-circuit 22 generates a corresponding driving signal according to the data signal received at the data signal terminal D and the first voltage signal received at the first power supply voltage terminal VDD. The driving sub-circuit 22 transmits the driving signal to the Mini LED or the Micro LED, so as to enable the Mini LED or the Micro LED to emit light, and control the luminance thereof.

Figure 4B:
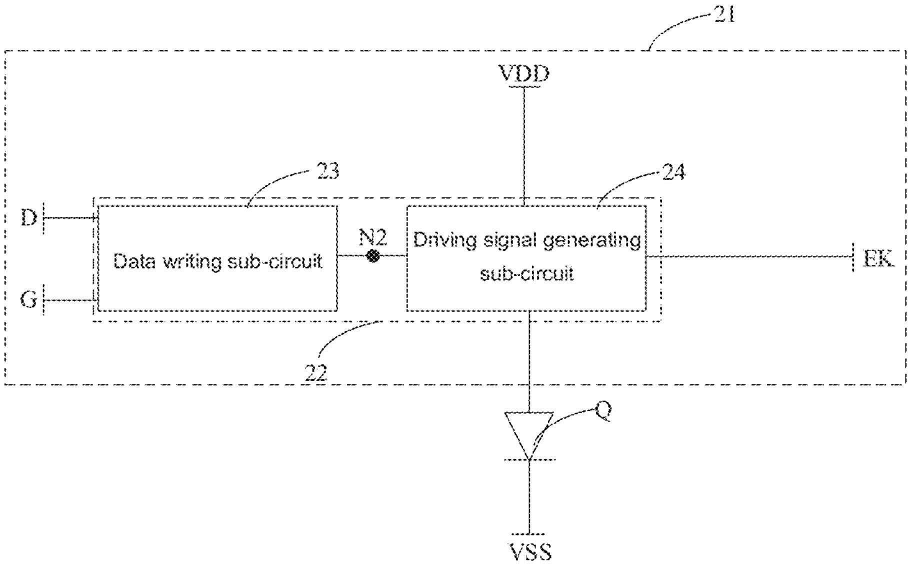
FIG. 4B is a configuration diagram of another pixel driving circuit provided in some embodiments of the present disclosure.

In some embodiments, as shown in FIG. 4B, the driving sub-circuit 22 includes a data writing sub-circuit 23 and a driving signal generating sub-circuit 24.

In some embodiments, the driving signal generating sub-circuit 24 is coupled to a second node N2, the first power supply voltage terminal VDD, the enable signal control terminal EK and the element Q to be driven. The driving signal generating sub-circuit 24 is configured to, in response to the enable signal received at the enable signal control terminal EK, generate the driving signal according to a voltage at the second node N2 and the first voltage signal received at the first power supply voltage terminal VDD; and the driving signal generating sub-circuit 24 is further configured to, in response to the enable signal received at the enable signal control terminal EK, control a current path through which the driving signal is transmitted to the element Q to be driven to be turned on and off.

In some examples, the first voltage signal is received at the first power supply voltage terminal VDD, and the first voltage signal may be a direct current voltage. For example, a voltage of the first voltage signal is 5 V. The first power supply voltage terminal VDD may be coupled to a first power supply voltage signal line, and the first power supply voltage terminal VDD receives the first voltage signal transmitted by the first power supply voltage signal line. In response to the enable signal received at the enable signal control terminal EK, the driving signal generating sub-circuit 24 enables a current path between the driving signal generating sub-circuit 24 and the element Q to be driven to be turned on, generates the driving signal according to the data signal written into the second node N2 and the first voltage signal, transmits the driving signal to the element to be driven, and controls an action of the element Q to be driven according to a current magnitude of the driving signal. For example, the driving signal is transmitted to the Mini LED or the Micro LED. The current magnitude of the driving signal is controlled by the data signal; driving signals with different magnitudes control the Mini LED or the Micro LED to emit light with different luminance, and the greater the current magnitude of the driving signal, the greater the luminance of the Mini LED or the Micro LED. That is, the greater the current magnitude of the driving signal, the greater a gray scale of a sub-pixel corresponding to the Mini LED or the Micro LED.

The enable signal received at the enable signal control terminal EK may control the current path through which the driving signal is transmitted to the element Q to be driven to be turned on or off. In a case where instantaneous luminance of the Mini LED or the Micro LED is certain, by controlling the number of times of light-emitting and the number of times of extinguishing of the Mini LED or the Micro LED within a time of a frame of image, as well as a time ratio of light-emitting to extinguishing, it may be possible to reduce the luminance of the overall display panel. When the display panel is at the low gray scale, poor brightness uniformity will not be caused by the Mini LED or the Micro LED due to the change of the current density.

Figure 5:
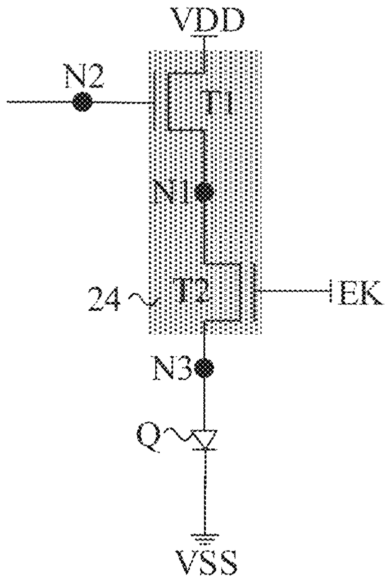
FIG. 5 is a circuit diagram of a data writing sub-circuit provided in some embodiments of the present disclosure.

In some embodiments, as shown in FIG. 5, the driving signal generating sub-circuit 24 includes a driving transistor T1 and an enable transistor T2. A first electrode of the driving transistor T1 is coupled to the first power supply voltage terminal VDD, a second electrode of the driving transistor T1 is coupled to a first node N1, and a control electrode of the driving transistor T1 is coupled to the second node N2. A first electrode of the enable transistor T2 is coupled to the first node N1, a second electrode of the enable transistor T2 is coupled to a third node N3, and a control electrode of the enable transistor T2 is coupled to the enable signal control terminal EK. The third node N3 is further coupled to a first electrode of the element Q to be driven, and a second electrode of the element Q to be driven is coupled to a second power supply voltage terminal VSS.

In some examples, the driving transistor T1 and the enable transistor T2 are both N-type transistors. When a voltage at the enable signal control terminal EK that is coupled to the control electrode of the enable transistor T2 is at a high level, the enable transistor T2 is in a turned-on state. The control electrode of the driving transistor T1 generates the driving signal under control of both the voltage at the second node N2 and the first voltage signal received at the first power supply voltage terminal VDD, and the driving signal is transmitted to the element Q to be driven through the enable transistor T2 that is turned on. The second electrode of the element Q to be driven is coupled to the second power supply voltage terminal VSS, and the second power supply voltage terminal VSS is at a low level. The element Q to be driven acts under the control of the driving signal. For example, the element Q to be driven is the Mini LED or the Micro LED, and the element Q to be driven emits light under an action of the driving signal.

It will be noted that, in embodiments of the present disclosure, the term "high level" refers to a magnitude of a potential at a node, a terminal or an output terminal in a circuit, and the potential may at least drive transistors to be turned on or off. For example, the high level may be 3.3 V or 5 V. For example, a gate of a P-type transistor is in a high-level state, and a voltage between a source and gate of the P-type transistor is greater than a threshold voltage thereof. Thus, the P-type transistor is in a turned-off state. Alternatively, a gate of an N-type transistor is in a high-level state, and a voltage between a source and gate of the N-type transistor is greater than a threshold voltage thereof. Thus, the N-type transistor is in a turned-on state.

The term "low level" refers to a magnitude of the potential at the node, the terminal or the output terminal in the circuit, and the potential may at least drive the transistors to be turned on or off. For example, the low level may be 0 V. For example, the gate of the P-type transistor is in a low-level state, and a voltage between the gate and source of the P-type transistor is less than the threshold voltage thereof. Thus, the P-type transistor is in a turned-on state. Alternatively, the gate of the N-type transistor is in a low-level state, and a voltage between the gate and source of the N-type transistor is less than the threshold voltage thereof. Thus, the N-type transistor is in a turned-off state.

In some embodiments, as shown in FIG. 4B, the data writing sub-circuit 23 is coupled to the data signal terminal D, the scan signal terminal G and the second node N2, and the data writing sub-circuit is configured to, in response to a scan signal received at the scan signal terminal G, transmit the data signal received at the data signal terminal D to the second node N2.

In some examples, the scan signal received at the scan signal terminal G controls a current path between the data signal terminal D and the second node N2 to be turned on, so that the data signal received at the data signal terminal D is transmitted to the second node N2.

Figure 6:
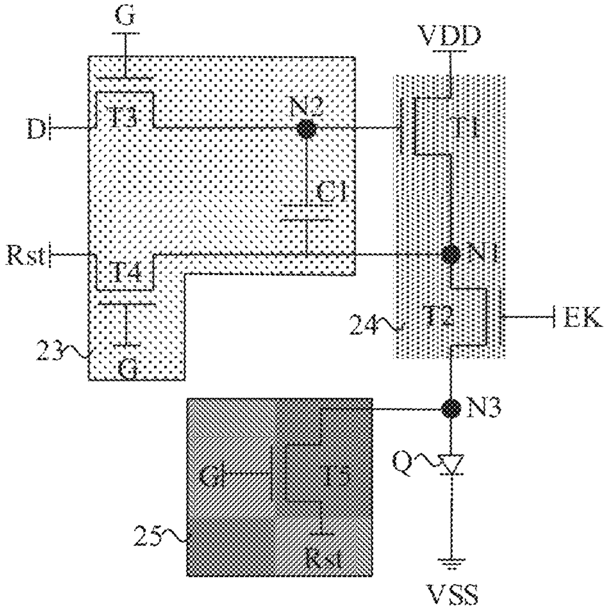
FIG. 6 is a circuit diagram of a pixel driving circuit provided in some embodiments of the present disclosure.

In some embodiments, as shown in FIG. 6, the data writing sub-circuit 23 includes: a writing transistor T3, a first capacitor C1 and a first reset transistor T4. A first electrode of the writing transistor T3 is coupled to the data signal terminal D, a second electrode of the write transistor T3 is coupled to the second node N2, and a control electrode of the writing transistor T3 is coupled to the scan signal terminal G. A first electrode of the first reset transistor T4 is coupled to the first node N1, a second electrode of the first reset transistor T4 is coupled to a reset signal terminal Rst, and a control electrode of the first reset transistor T4 is coupled to the scan signal terminal G. A first electrode of the first capacitor C1 is coupled to the first node N1, and a second electrode of the first capacitor C1 is coupled to the second node N2.

In some examples, the writing transistor T3 and the first reset transistor T4 are both N-type transistors, the scan signal terminal G receives the scan signal, and a voltage at the scan signal terminal G is at a high level, so that the voltage at the scan signal terminal G controls the first reset transistor T4 to be turned on. A reset signal received at the reset signal terminal Rst is transmitted to the first node N1 through the first reset transistor T4 that is turned on, so that a voltage at the first node N1 remains at a low level or a high level after being reset.

The voltage at the scan signal terminal G is at the high level, which may simultaneously control the writing transistor T3 to be turned on. The data signal received at the data signal terminal D is transmitted to the second node N2 through the writing transistor T3 that is turned on.

Figure 7:
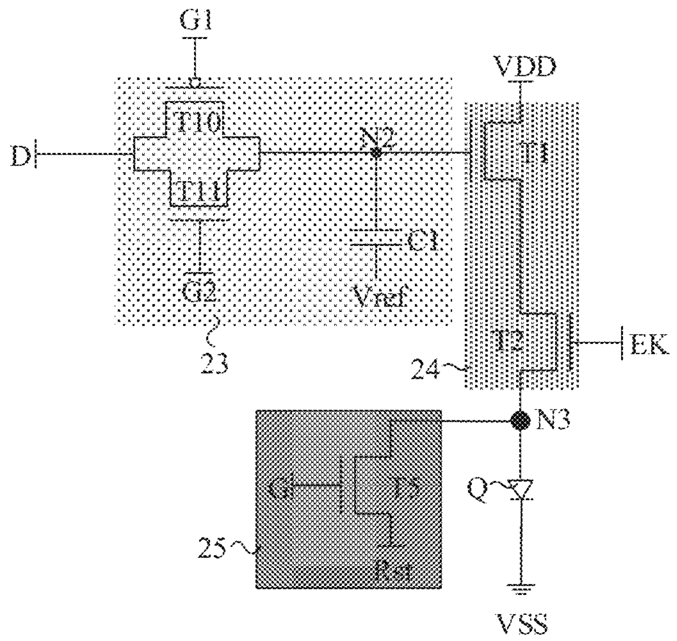
FIG. 7 is a circuit diagram of another pixel driving circuit provided in some embodiments of the present disclosure.
Figure 15:
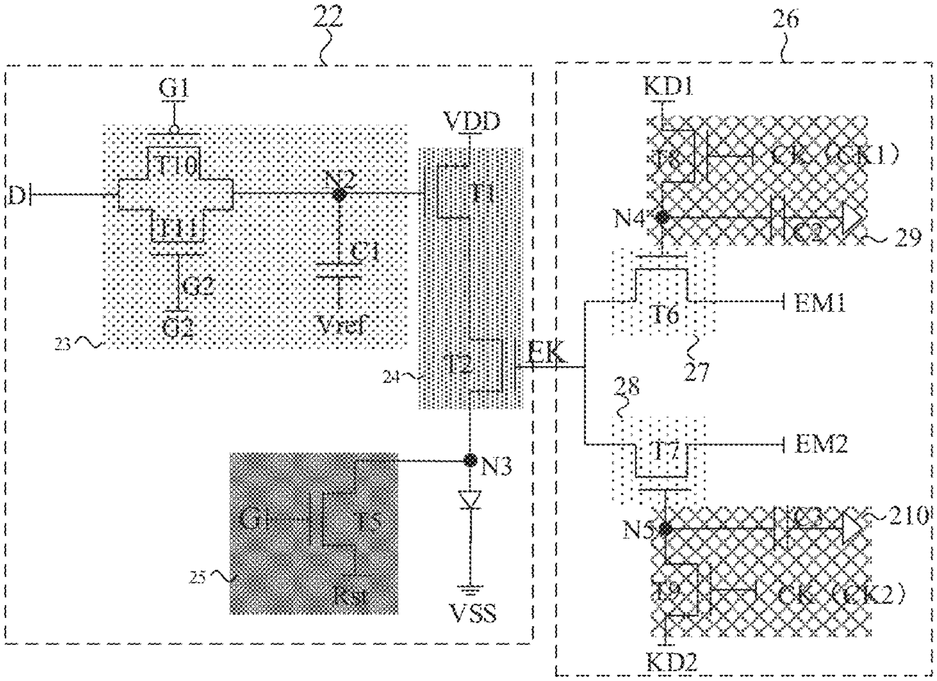
FIG. 15 is a circuit diagram of a second-type pixel driving circuit provided in some embodiments of the present disclosure.

In some other embodiments, as shown in FIGS. 7 and 15, the data writing sub-circuit 23 includes: a first transmission transistor T10, a second transmission transistor T11 and a first capacitor C1. The scan signal terminal G includes a first scan signal terminal G1 and a second scan signal terminal G2. A first electrode of the first transmission transistor T10 is coupled to the data signal terminal D, a second electrode of the first transmission transistor T10 is coupled to the second node N2, and a control electrode of the first transmission transistor T10 is coupled to the first scan signal terminal G1. A first electrode of the second transmission transistor T11 is coupled to the data signal terminal D, a second electrode of the second transmission transistor T11 is coupled to the second node N2, and a control electrode of the second transmission transistor T11 is coupled to the second scan signal terminal G2. A first electrode of the first capacitor C1 is coupled to the second node N2, and a second electrode of the first capacitor C1 is coupled to a reference voltage terminal Vref.

In some examples, the first transmission transistor T10 is a P-type transistor and the second transmission transistor T11 is an N-type transistor. The first electrode of the first transmission transistor T10 is coupled to the first electrode of the second transmission transistor T11, and the second electrode of the first transmission transistor T10 is coupled to the second electrode of the second transmission transistor T11. Thus, the first transmission transistor T10 and the second transmission transistor T11 together constitute a field effect transistor transmission gate, and the field effect transistor transmission gate has an on resistance (several hundred ohms) and a very high off resistance (greater than 109 ohms). The field effect transistor transmission gate constituted by the first transmission transistor T10 and the second transmission transistor T11 helps transmit the data signal. When the transmission gate is turned on, and the data signal is transmitted from the data signal terminal D to the second node N2, there is small loss; and when the transmission gate is turned off, a cutoff resistance of the current path between the data signal terminal D and the second node N2 is extremely large, thereby avoiding electric leakage.

It will be noted that, when the transmission gate is turned on, a voltage at the first scan signal terminal G1 is at a low level, and a voltage at the second scan signal terminal G2 is at a high level; and when the transmission gate is turned off, the voltage at the first scan signal terminal G1 is at a high level, and the voltage at the second scan signal terminal G2 is at a low level.

The second electrode of the first capacitor C1 is coupled to the reference voltage terminal Vref. A voltage at the reference voltage terminal Vref may be at a low level. For example, the voltage at the reference voltage terminal Vref may be zero or 1 V.

Figure 8:
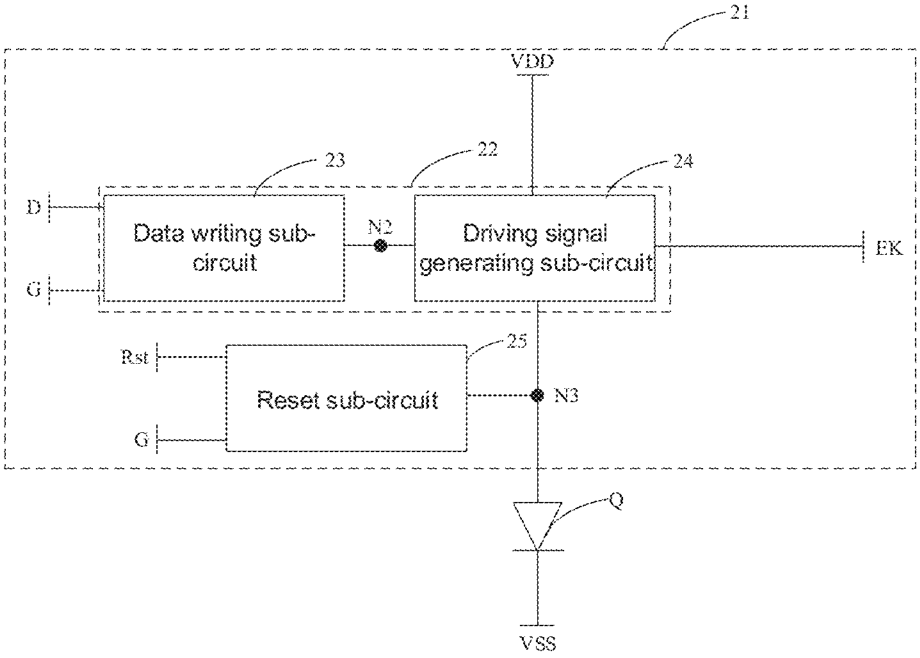
FIG. 8 is a configuration diagram of yet another pixel driving circuit provided in some embodiments of the present disclosure.

In some embodiments, as shown in FIG. 8, the pixel driving circuit 21 further includes a reset sub-circuit 25, and the reset sub-circuit 25 is coupled to the third node N3, the scan signal terminal G and the reset signal terminal Rst. The reset sub-circuit 25 is configured to, in response to the scan signal received at the scan signal terminal G, transmit the reset signal received at the reset signal terminal Rst to the third node N3.

In some examples, as shown in FIGS. 6 and 7, the reset sub-circuit 25 resets a potential at the third node N3 in response to the scan signal. The third node N3 is further coupled to the second electrode of the enable transistor T2 and the first electrode of the element Q to be driven. The third node N3 is reset before the element Q to be driven is driven by the driving signal, which may avoid the driving signal being affected by an original potential at the third node N3, thereby ensuring an accurate action of the element Q to be driven. That is, accurate luminance of the Mini LED or the Micro LED is ensured.

In some embodiments, as shown in FIGS. 6 and 7, the reset sub-circuit 25 includes a second reset transistor T5. A first electrode of the second reset transistor T5 is coupled to the third node N3, a second electrode of the second reset transistor T5 is coupled to the reset signal terminal Rst, and a control electrode of the second reset transistor T5 is coupled to the scan signal terminal G.

In some examples, the second reset transistor T5 is an N-type transistor, the scan signal terminal G receives the scan signal, and the voltage at the scan signal terminal G is at the high level, so that the second reset transistor T5 is turned on. The reset signal received at the reset signal terminal Rst is transmitted to the third node N3 through the second reset transistor T5, so that a voltage at the third node N3 remains at a low level or a high level after being reset.

In some embodiments, the silicon-based field effect transistors may also be referred to as silicon-based transistors. The silicon-based field effect transistor includes a silicon substrate, thin film microbridge(s), and at least one thin film transistor. The silicon substrate includes at least one microcavity, and each microcavity enables a thin film microbridge located over the microcavity to be suspended. The thin film microbridge is arranged over the silicon substrate, and a thin film transistor is arranged above a central region of each thin film microbridge. The silicon-based transistor has following advantages compared with a glass-based thin film transistor.

In a first aspect, a size of a silicon-based transistor is tens of nanometers to hundreds of nanometers, and a size of a glass-based thin film transistor is several microns to tens of microns. Thus, the size of the silicon-based transistor is relatively small.

In a second aspect, a turned-on time of the silicon-based transistor is tens of picoseconds, and a turned-on time of the glass-based thin film transistor is between tens of nanoseconds to hundreds of nanoseconds. Thus, the turned-on time of the silicon-based transistors is relatively fast.

In a third aspect, the stability of the silicon-based transistor is higher than the stability of transistors fabricated on a glass substrate, and a pixel driving circuit composed of silicon-based transistors does not need to compensate for a threshold voltage.

In some embodiments, the driving sub-circuit provided in some embodiments of the present disclosure adopts silicon-based transistors, and thus there is no need to compensate for the threshold voltage. A structure of the driving sub-circuit is simple, and a volume of a single silicon-based transistor is reduced. As a result, an area of the driving sub-circuit may be greatly reduced, thereby greatly increasing a pixel density of the display panel.

Figure 9:
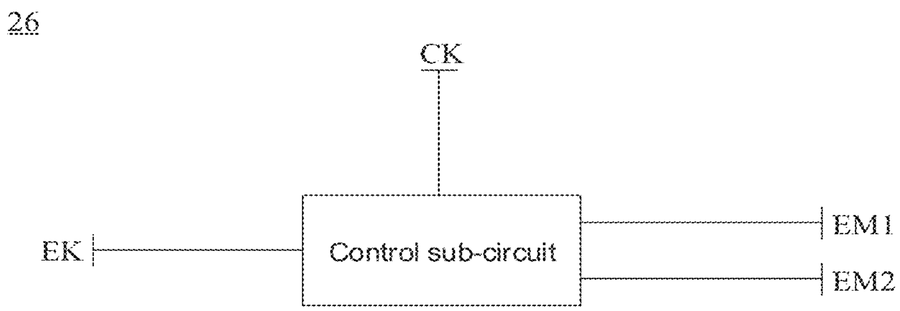
FIG. 9 is a configuration diagram of a driving sub-circuit provided in some embodiments of the present disclosure.

In some embodiments, as shown in FIG. 9, the control sub-circuit 26 is coupled to a control signal terminal CK, a first enable signal terminal EM1, a second enable signal terminal EM2 and the enable signal control terminal EK. The control sub-circuit 26 is configured to, in response to a signal received at the control signal terminal CK, transmit a signal received at the first enable signal terminal EM1 to the enable signal control terminal EK, or transmit a signal received at the second enable signal terminal EM2 to the enable signal control terminal EK.

In some examples, the control sub-circuit 26 is used to control the current path through which the driving signal is transmitted to the element Q to be driven to be turned on and off. In a case where a sub-pixel corresponding to the pixel driving circuit is at a high gray scale, the control sub-circuit enables a current path between the first enable signal terminal EM1 and the enable signal control terminal EK to be turned on. In a pixel light-emitting phase, a first enable signal received at the first enable signal terminal EM1 is a direct current signal with a constant voltage. In a case where the sub-pixel corresponding to the pixel driving circuit is at a low gray scale, the control sub-circuit enables a current path between the second enable signal terminal EM2 and the enable signal control terminal EK to be turned on. In the pixel light-emitting phase, a second enable signal received at the second enable signal terminal EM2 is a pulse signal.

It will be noted that the enable signal line includes a first enable signal line and a second enable signal line. The first enable signal line is coupled to the first enable signal terminal EM1, and the first enable signal line is configured to transmit the first enable signal to the first enable signal terminal EM1. The second enable signal line is coupled to the second enable signal terminal EM2, and the second enable signal line is configured to transmit the second enable signal to the second enable signal terminal EM2.

In the pixel light-emitting phase, as shown in FIG. 9, and in combination with FIG. 6 or 7, the pulse signal may control the enable transistor T2 to be intermittently turned on and off, and thus the driving signal is intermittently transmitted to the element to be driven Q. When the enable transistor T2 is turned on, the driving signal is transmitted to the element Q to be driven, and thus the element Q to be driven is driven by the driving signal to act. When the enable transistor T2 is turned off, the driving signal is not transmitted to the element Q to be driven, and thus the element Q to be driven stops acting. For example, the element Q to be driven is the Mini LED or the Micro LED. The driving signal received by the Mini LED or the Micro LED becomes a pulse signal under an influence of the second enable signal, and the Mini LED or the Micro LED intermittently emits light and goes out under the action of the pulse signal. In the frame of image, the sub-pixel intermittently emits light and goes out, and an overall gray scale (luminance) of the sub-pixel in the frame of image is lower than instantaneous luminance of the sub-pixel when emitting light. That is, the current density of the driving signal received by the Mini LED or the Micro LED may be constant, and the gray scale of the sub-pixel in the frame of image may be controlled. Thus, it may be possible to avoid the problem of poor brightness uniformity caused by the Mini LED or the Micro LED due to the change of the current density.

Figure 10:
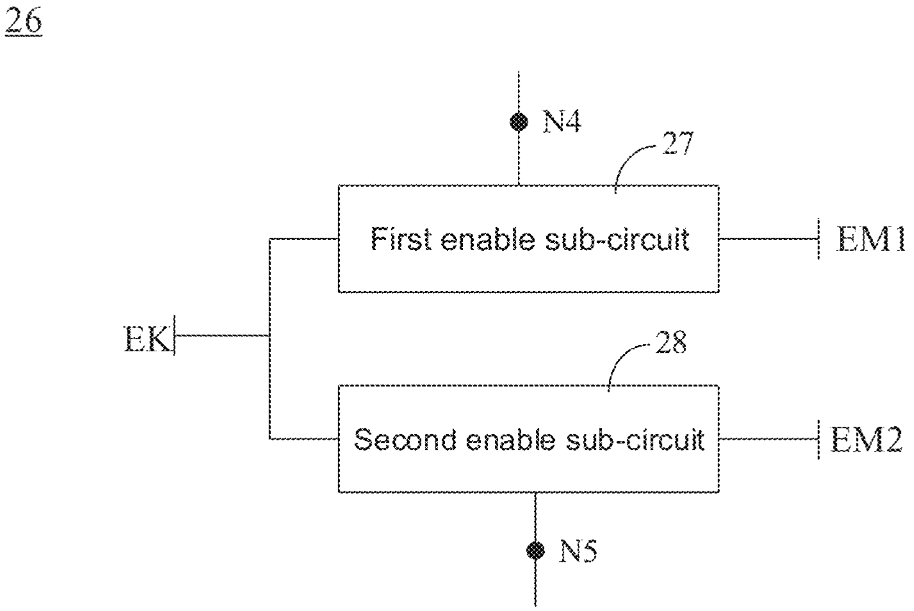
FIG. 10 is a configuration diagram of another driving sub-circuit provided in some embodiments of the present disclosure.

In some embodiments, as shown in FIG. 10, the control sub-circuit 26 includes a first enable sub-circuit 27 and a second enable sub-circuit 28. The first enable sub-circuit 27 is coupled to a fourth node N4, the first enable signal terminal EM1 and the enable signal control terminal EK, and the first enable sub-circuit 27 is configured to, in response to a first control signal received at the fourth node N4, transmit the first enable signal received at the first enable signal terminal EM1 to the enable signal control terminal EK. The second enable sub-circuit 28 is coupled to a fifth node N5, the second enable signal terminal EM2 and the enable signal control terminal EK, and the second enable sub-circuit 28 is configured to, in response to a second control signal received at the fifth node N5, transmit the second enable signal received at the second enable signal terminal EM2 to the enable signal control terminal EK.

In some examples, under control of a voltage at the fourth node N4, the first enable sub-circuit 27 may transmit the first enable signal received at the first enable signal terminal EM1 to the enable signal control terminal EK. Under control of a voltage at the fifth node N5, the second enable sub-circuit 28 may transmit the second enable signal received at the second enable signal terminal EM2 to the enable signal control terminal EK.

Figure 11:
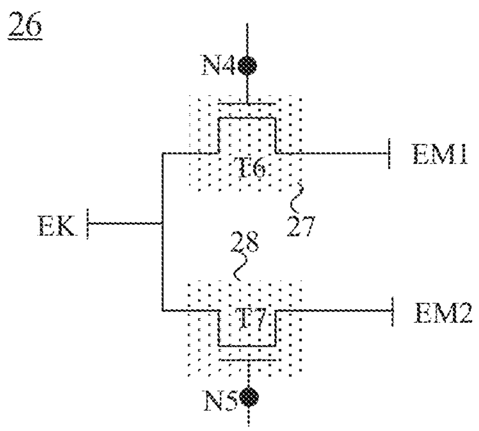
FIG. 11 is a circuit diagram of a driving sub-circuit provided in some embodiments of the present disclosure.

In some embodiments, as shown in FIG. 11, the first enable sub-circuit 27 includes a first control transistor T6. A first electrode of the first control transistor T6 is coupled to the first enable signal terminal EM1, a second electrode of the first control transistor T6 is coupled to the enable signal control terminal EK, and a control electrode of the first control transistor T6 is coupled to the fourth node N4. The second enable sub-circuit 28 includes a second control transistor T7. A first electrode of the second control transistor T7 is coupled to the second enable signal terminal EM2, a second electrode of the second control transistor T7 is coupled to the enable signal control terminal EK, and a control electrode of the second control transistor T7 is coupled to the fifth node N5.

In some examples, transistors included in the first enable sub-circuit 27 and the second enable sub-circuit 28 are of a same conduction type. For example, the first control transistor T6 and the second control transistor T7 are both N-type transistors or P-type transistors. Descriptions are made by considering an example in which the first control transistor T6 and the second control transistor T7 are both N-type transistors. When the voltage at the fourth node N4 is at a high level, the control electrode of the first control transistor T6 is turned on under control of the high level, and the first enable signal received at the first enable signal terminal EM1 is transmitted to the enable signal control terminal EK through the first control transistor T6. When the voltage at the fifth node N5 is at a high level, the control electrode of the second control transistor T7 is turned on under control of the high level, and the second enable signal received at the second enable signal terminal EM2 is transmitted to the enable signal control terminal EK through the second control transistor T7.

In some other examples, the transistors included in the first enable sub-circuit and the second enable sub-circuit are of opposite conduction types. For example, the first control transistor is an N-type transistor, and the second control transistor is a P-type transistor; or the first control transistor is a P-type transistor, and the second control transistor is an N-type transistor. Descriptions are made by considering an example in which the first control transistor is the P-type transistor and the second control transistor is the N-type transistor. When the voltage at the fourth node is at a low level, the control electrode of the first control transistor is turned on under control of the low level, and the first enable signal received at the first enable signal terminal is transmitted to the enable signal control terminal through the first control transistor. When the voltage at the fifth node is at the high level, the control electrode of the second control transistor is turned on under control of the high level, and the second enable signal received at the second enable signal terminal is transmitted to the enable signal control terminal through the second control transistor.

Figure 12:
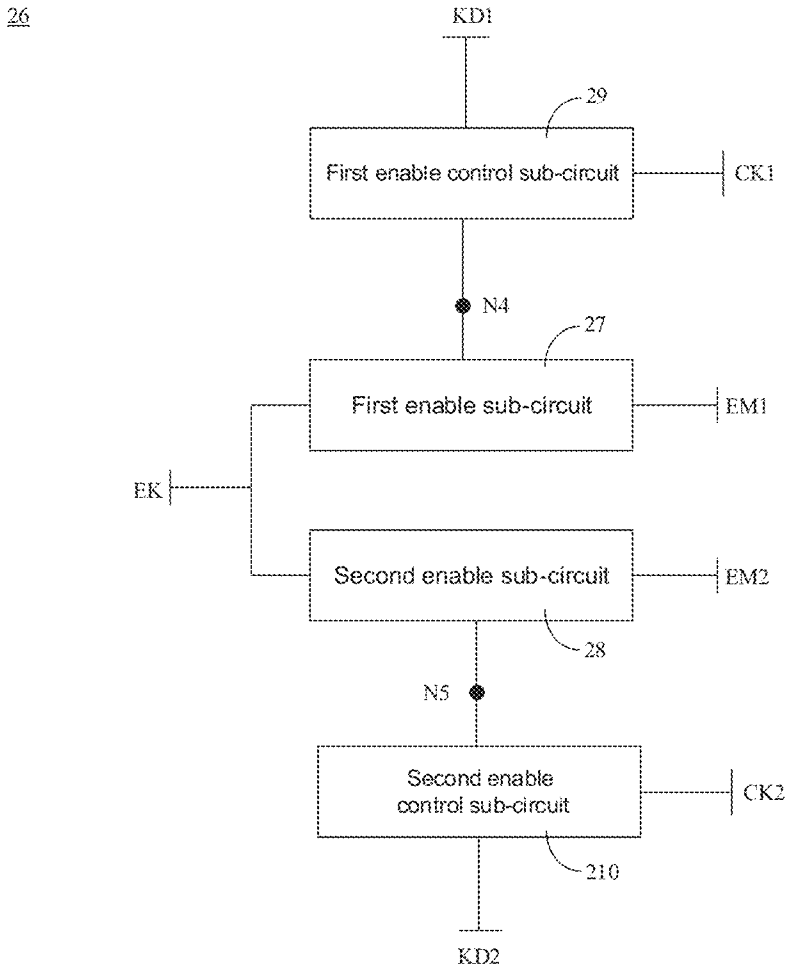
FIG. 12 is a configuration diagram of yet another driving sub-circuit provided in some embodiments of the present disclosure.

In some embodiments, as shown in FIG. 12, the transistors included in the first enable sub-circuit 27 and the second enable sub-circuit 28 are of a same conduction type.

In this case, the control sub-circuit 26 further includes a first enable control sub-circuit 29 and a second enable control sub-circuit 210, and the control signal terminal CK includes a first control signal terminal CK1 and a second control signal terminal CK2. The first enable control sub-circuit 29 is coupled to the fourth node N4, the first control signal terminal CK1 and a first control data signal terminal KD1, and the first enable control sub-circuit 29 is configured to, in response to a first control gate signal received at the first control signal terminal CK1, transmit a signal received at the first control data signal terminal KD1 to the fourth node N4. The second enable control sub-circuit 210 is coupled to the fifth node N5, the second control signal terminal CK2 and a second control data signal terminal KD2, and the second enable control sub-circuit 210 is configured to, in response to a second control gate signal received at the second control signal terminal CK2, transmit a signal received at the second control data signal terminal KD2 to the fifth node N5.

Figure 13:
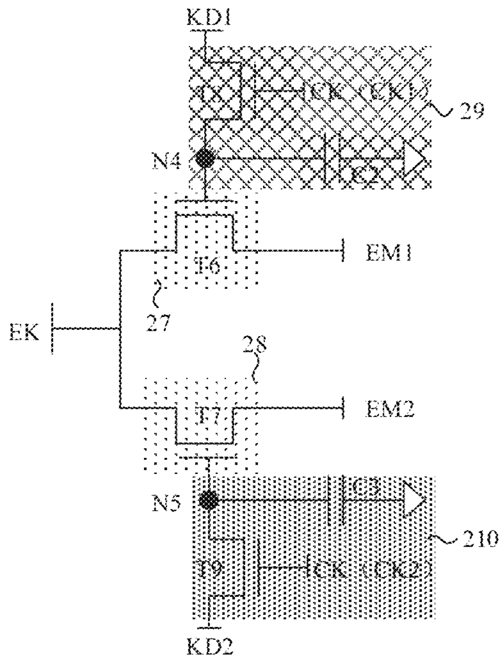
FIG. 13 is a circuit diagram of another driving sub-circuit provided in some embodiments of the present disclosure.
Figure 14:
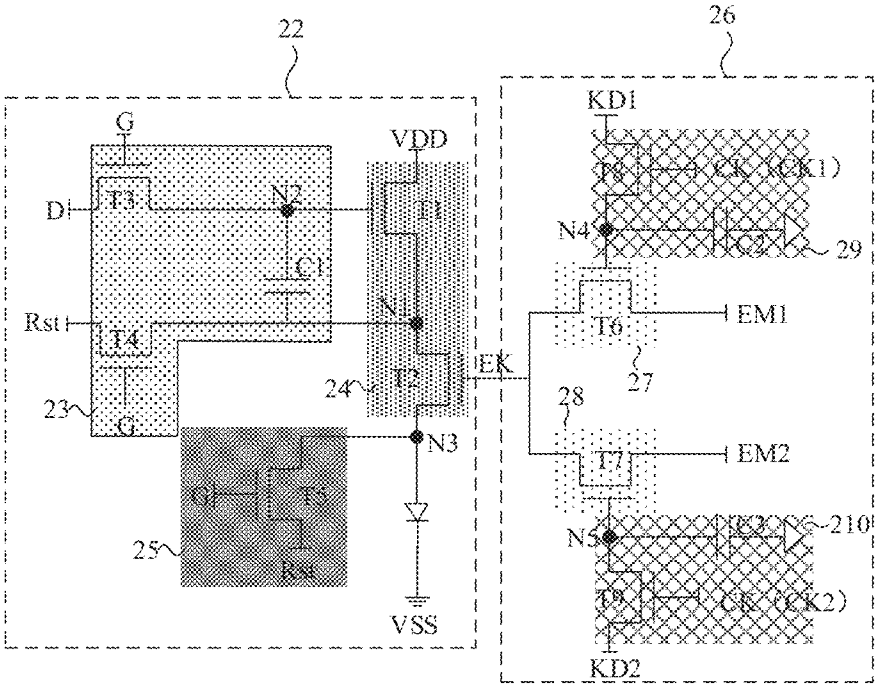
FIG. 14 is a circuit diagram of a first-type pixel driving circuit provided in some embodiments of the present disclosure.

In some examples, as shown in FIGS. 13 and 14, the first control transistor T6 and the second control transistor T7 are both N-type transistors, and voltages at the first control data signal terminal KD1 and the second control data signal terminal KD2 are both maintained at high levels. In response to the first control gate signal received at the first control signal terminal CK1, the first enable control sub-circuit 29 enables a current path between the first control data signal terminal KD1 and the fourth node N4 to be turned on, and thus the signal at the first control data signal terminal KD1 is transmitted to the fourth node N4. The voltage at the fourth node N4 is at the high level, so that the first enable sub-circuit 27 may be controlled to be turned on. Or the current path between the first control data signal terminal KD1 and the fourth node N4 is turned off, and the voltage at the fourth node N4 is at a low level, so that the first enable sub-circuit 27 may be controlled to be turned off.

In response to the second control gate signal received at the second control signal terminal CK2, the second enable control sub-circuit 210 enables a current path between the second control data signal terminal KD2 and the fifth node N5 to be turned on, and thus the signal at the second control data signal terminal KD2 is transmitted to the fifth node N5. The voltage at the fifth node N5 is at the high level, so that the second enable control sub-circuit 210 may be controlled to be turned on. Or the current path between the second control data signal terminal KD2 and the fifth node N5 is turned off, and the voltage at the fifth node N5 is at a low level, so that the second enable control sub-circuit 210 may be controlled to be turned off.

Figure 16:
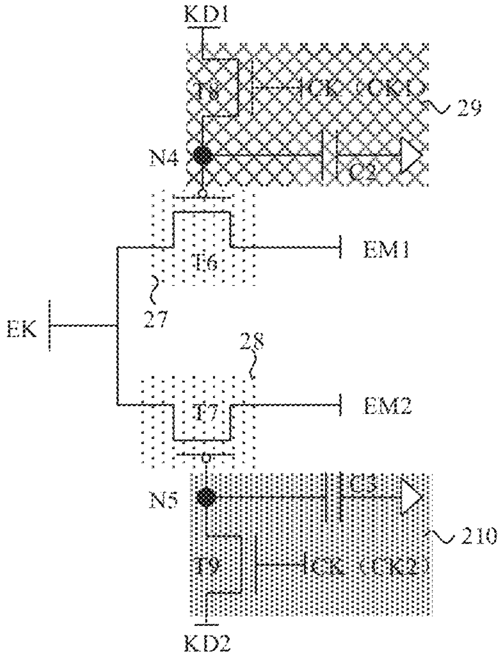
FIG. 16 is a diagram of yet another driving sub-circuit provided in some embodiments of the present disclosure.

In some other examples, as shown in FIG. 16, the first control transistor T6 and the second control transistor T7 are both P-type transistors, and the first control gate signal received at the first control data signal terminal KD1 and the second control gate signal received at the second control data signal terminal KD2 both at low levels. The first enable control sub-circuit 29 controls a low-level signal to be transmitted to the fourth node N4, so that a corresponding control signal is transmitted from the first enable signal terminal EM1 to the enable signal control terminal EK under control of the voltage at the fourth node. The second enable control sub-circuit 210 controls a low-level signal to be transmitted to the fifth node N5, so that a corresponding control signal is transmitted from the second enable signal terminal EM2 to the enable signal control terminal EK under control of the voltage at the fifth node N5.

In some embodiments, as shown in FIGS. 13 and 16, the first enable control sub-circuit 29 includes a first enable control transistor T8 and a second capacitor C2. A first electrode of the first enable control transistor T8 is coupled to the first control data signal terminal KD1, a second electrode of the first enable control transistor T8 is coupled to the fourth node N4, and a control electrode of the first enable control transistor T8 is coupled to the first control signal terminal CK1. A first electrode of the second capacitor C2 is coupled to the fourth node N4, and a second electrode of the second capacitor C2 is coupled to a first voltage signal terminal VSS1.

The second enable control sub-circuit 210 includes a second enable control transistor T9 and a third capacitor C3. A first electrode of the second enable control transistor T9 is coupled to the second control data signal terminal KD2, a second electrode of the second enable control transistor T9 is coupled to the fifth node N5, and a control electrode of the second enable control transistor T9 is coupled to the second control signal terminal CK2. A first electrode of the third capacitor C3 is coupled to the fifth node N5, and a second electrode of the third capacitor C3 is coupled to a second voltage signal terminal VSS2.

In some examples, the first enable control transistor T8 and the second enable control transistor T9 may both be N-type transistors, the first control signal terminal CK1 receives the first control gate signal, and a voltage of the first control gate signal is at a high level; a voltage at the control electrode of the first enable control transistor T8 is at the high level, so that the first enable control transistor T8 is turned on, and the first control gate signal received at the first control data signal terminal KD1 is transmitted to the fourth node N4 through the first enable control transistor T8 that is turned on.

The second control signal terminal CK2 receives the second control gate signal, and a voltage of the second control gate signal is at a high level; a voltage at the control electrode of the second enable control transistor T9 is at the high level, so that the second enable control transistor T9 is turned on, and the second control gate signal received at the second control data signal terminal KD2 is transmitted to the fifth node N5 through the second enable control transistor T9 that is turned on.

Figure 17:
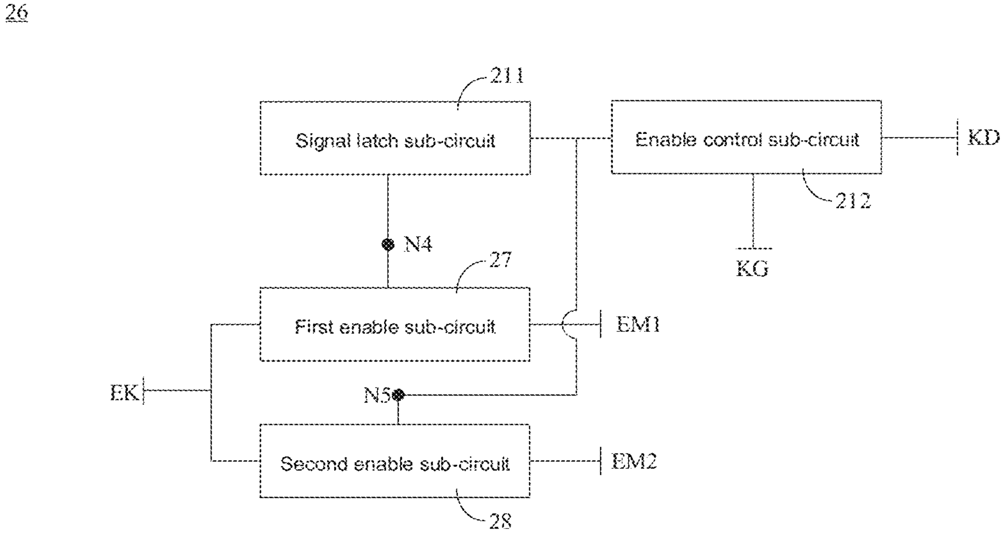
FIG. 17 is a configuration diagram of yet another driving sub-circuit provided in some embodiments of the present disclosure.

In some other embodiments, as shown in FIG. 17, the transistors included in the first enable sub-circuit 27 and the second enable sub-circuit 28 are of opposite conduction types.

The control sub-circuit 26 further includes an enable control sub-circuit 212 and a signal latch sub-circuit 211. The enable control sub-circuit 212 is coupled to the control gate signal terminal KG, a control data signal terminal KD and the fifth node N5, and the enable control sub-circuit 212 is configured to, in response to a control gate signal received at the control gate signal terminal KG, transmit a first control data signal received at the control data signal terminal KD to the fifth node N5. The signal latch sub-circuit 211 is coupled to the fourth node N4 and the fifth node N5, and the signal latch sub-circuit is configured to transmit a second control data signal received at the control data signal terminal KD to the fourth node N4.

It will be understood that, two electrical signals may be received at the control data signal terminal KD, and the two electrical signals are the first control data signal and the second control data signal. The first control data signal may be, for example, a high-level signal, and the second control data signal may be, for example, a low-level signal.

Figure 18:
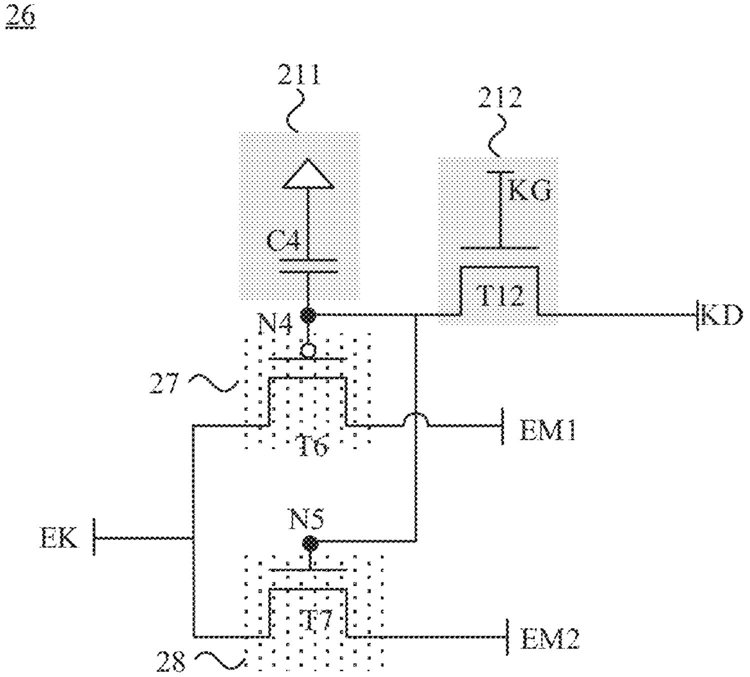
FIG. 18 is a diagram of yet another driving sub-circuit provided in some embodiments of the present disclosure.
Figure 19:
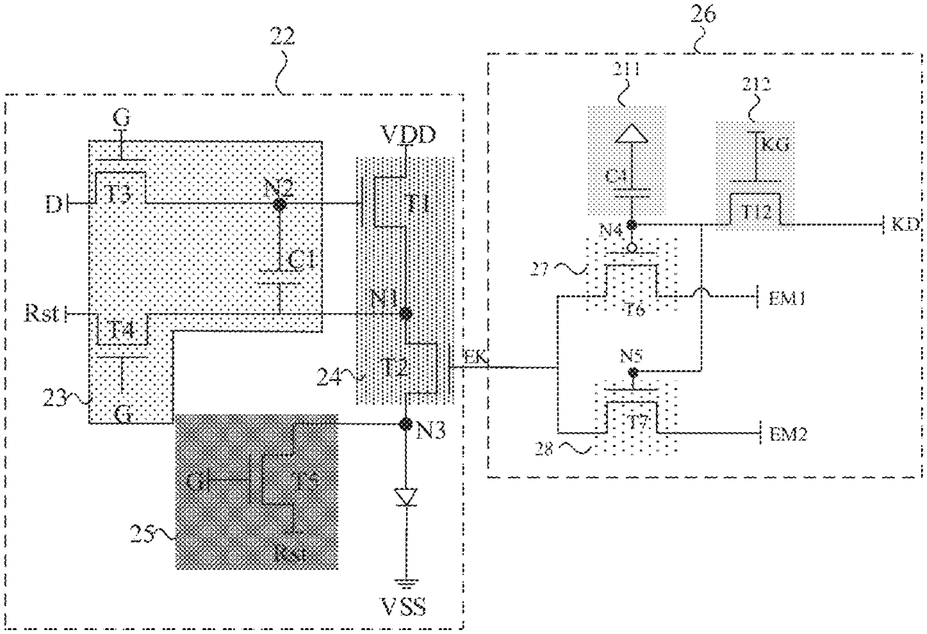
FIG. 19 is a circuit diagram of a third-type pixel driving circuit provided in some embodiments of the present disclosure.
Figure 20:
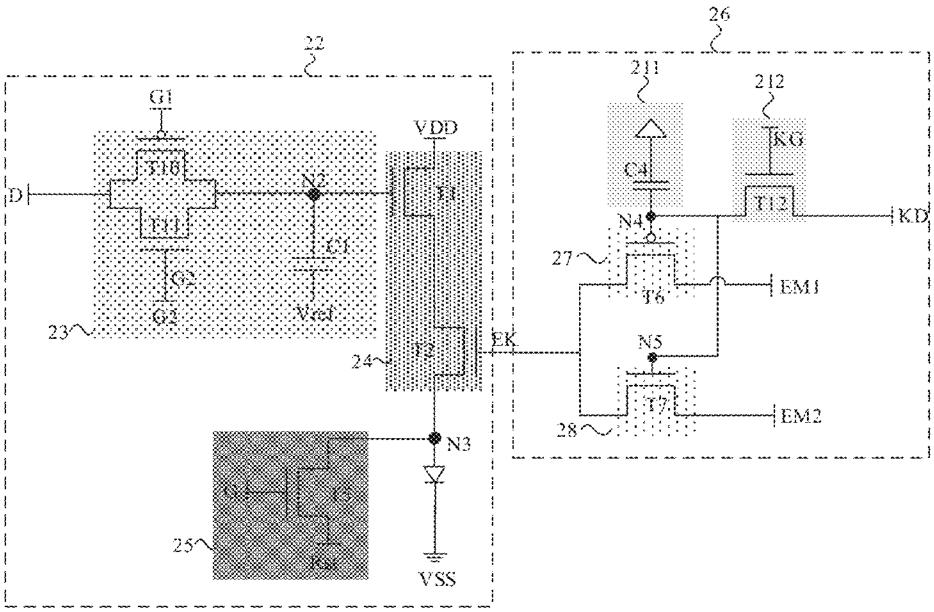
FIG. 20 is a circuit diagram of a fourth-type pixel driving circuit provided in some embodiments of the present disclosure.

In some examples, as shown in FIGS. 18 to 20, the transistors included in the first enable sub-circuit 27 and the second enable sub-circuit 28 are of opposite conduction types. For example, the first control transistor T6 in the first enable sub-circuit 27 is a P-type transistor, and the second control transistor T7 in the second enable sub-circuit 28 is an N-type transistor.

A voltage of the first control data signal received at the control data signal terminal KD is at a high level. The first control data signal is transmitted to the fifth node N5 and a terminal of the signal latch sub-circuit 211 through the enable control sub-circuit 212 that is turned on. A voltage of a signal transmitted from a terminal of the signal latch sub-circuit 211 to the fourth node N4 is at a high level. Thus, the first control transistor T6 is turned off under control of the high level, and the second control transistor T7 is turned on under control of the high level.

A voltage of the second control data signal received at the control data signal terminal KD is at a low level. The second control data signal is transmitted to the fifth node N5 and a terminal of the signal latch sub-circuit 211 through the enable control sub-circuit 212 that is turned on. The voltage of the signal transmitted from a terminal of the signal latch sub-circuit 211 to the fourth node N4 is at a low level. Thus, the first control transistor T6 is turned on under control of the low level, and the second control transistor T7 is turned off under control of the low level.

The enable control sub-circuit 212 is turned off under control of the control gate signal at the control gate signal terminal KG. That is, the voltage at the fifth node N5 is at a low level, and the voltage at the fourth node N4 is at a low level; the first control transistor T6 is turned on under the control of the low level, and the second control transistor T7 is turned off under the control of the low level.

Figure 21:
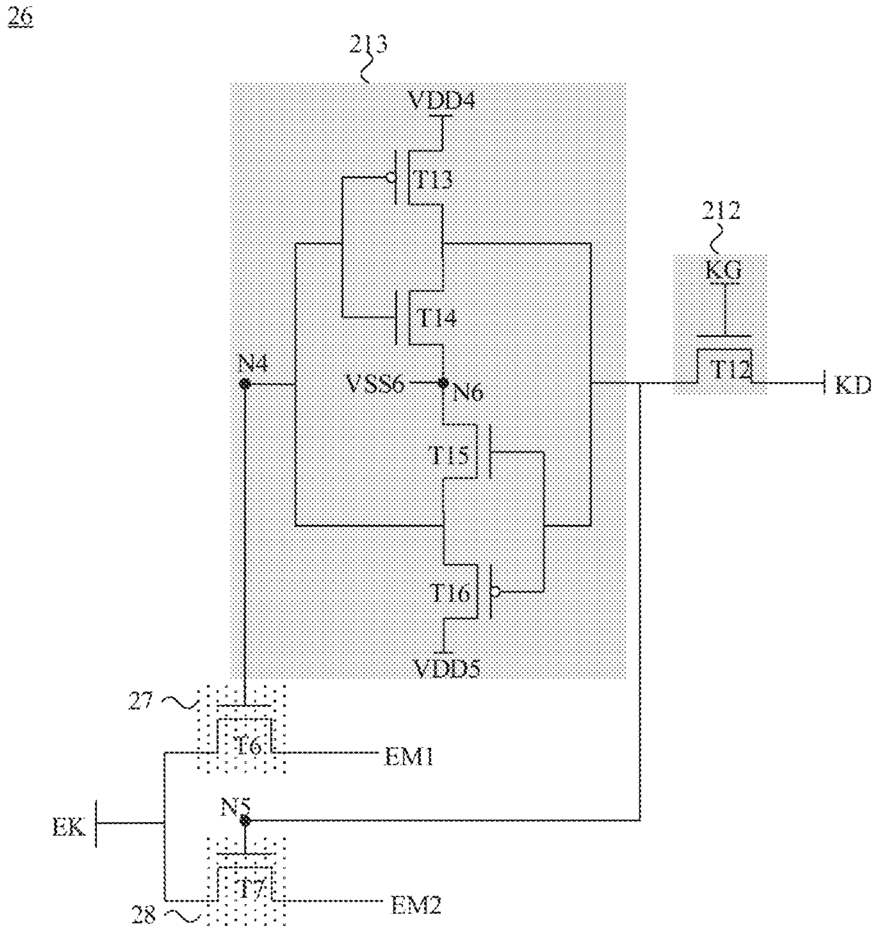
FIG. 21 is a diagram of yet another driving sub-circuit provided in some embodiments of the present disclosure.
Figure 22:
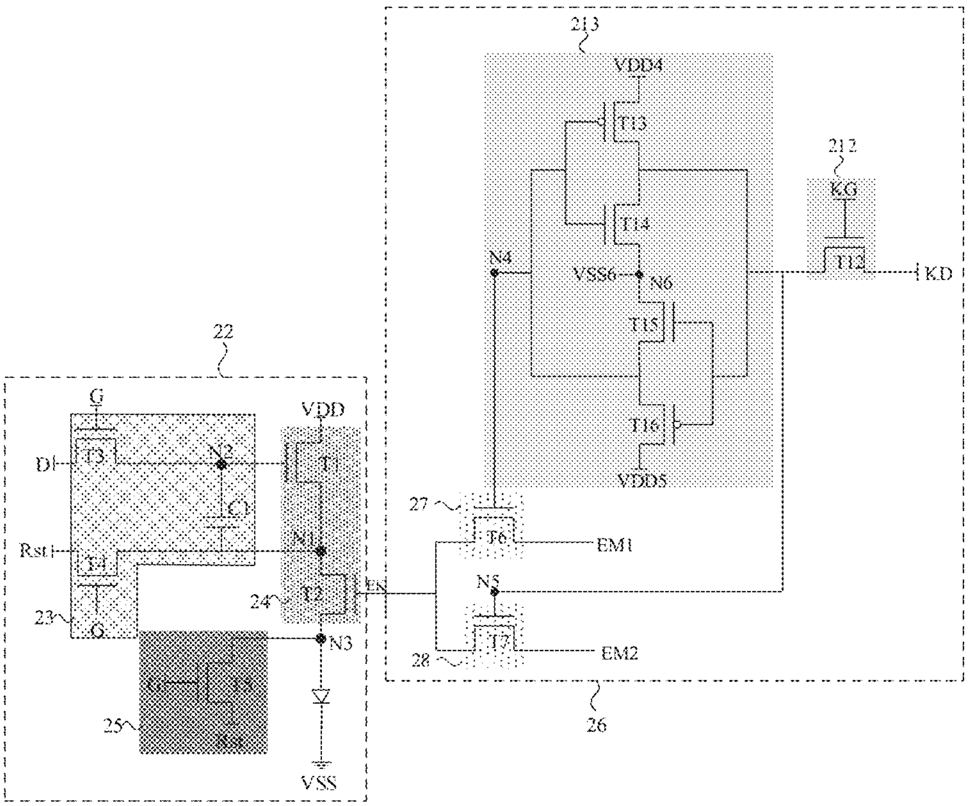
FIG. 22 is a circuit diagram of a fifth-type pixel driving circuit provided in some embodiments of the present disclosure.
Figure 23:
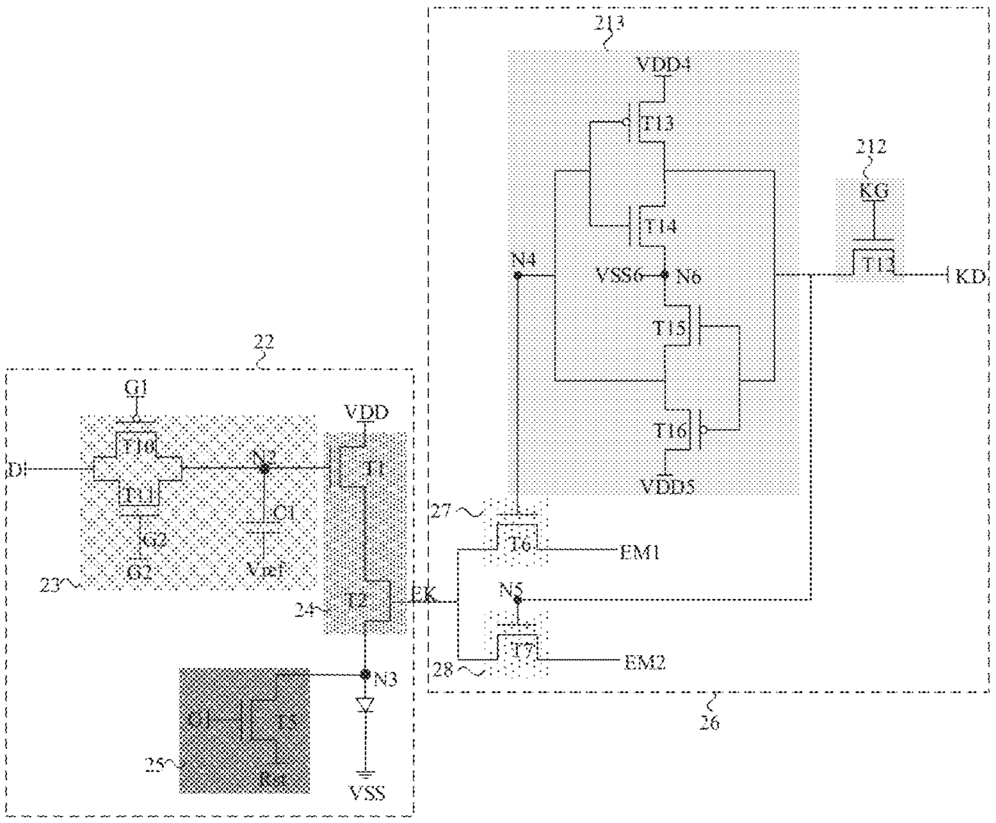
FIG. 23 is a circuit diagram of a sixth-type pixel driving circuit provided in some embodiments of the present disclosure.

In some other examples, as shown in FIGS. 21 to 23, the transistors included in the first enable sub-circuit 27 and the second enable sub-circuit 28 are of same conduction types. For example, the first control transistor T6 in the first enable sub-circuit 27 is an N-type transistor, and the second control transistor T7 in the second enable sub-circuit 28 is an N-type transistor.

The voltage of the first control data signal received at the control data signal terminal KD is at a high level. The control data signal is transmitted to the fifth node N5 and a terminal of the signal latch sub-circuit 211 through the enable control sub-circuit 212 that is turned on. The voltage of the signal transmitted from another terminal of the signal latch sub-circuit 211 to the fourth node N4 is at a low level. Thus, the first control transistor T6 is turned off under control of the low level, and the second control transistor T7 is turned on under control of the high level.

The voltage of the second control data signal received at the control data signal terminal KD is at a low level. The second control data signal is transmitted to the fifth node N5 and the terminal of the signal latch sub-circuit 211 through the enable control sub-circuit 212 that is turned on. The voltage of the signal transmitted from the another terminal of the signal latch sub-circuit 211 to the fourth node N4 is at a high level. Thus, the first control transistor T6 is turned on under control of the high level, and the second control transistor T7 is turned off under control of the low level.

The enable control sub-circuit 212 is turned off under control of the control gate signal at the control gate signal terminal KG. That is, the voltage at the fifth node N5 is at a low level, and the voltage at the fourth node N4 is at a high level. The first control transistor T6 is turned on under control of the high level, and the first control transistor T6 is turned off under control of the low level; the second control transistor T7 is turned on under control of the high level, and the second control transistor T7 is turned off under control of the low level.

In some embodiments, as shown in FIGS. 18 to 23, the enable control sub-circuit 212 includes an enable control transistor T12, a first electrode of the enable control transistor T12 is coupled to the control data signal terminal KD, a second electrode of the enable control transistor T12 is coupled to the fifth node N5 and the signal latch sub-circuit 211, and a control electrode of the enable control transistor T12 is coupled to the control gate signal terminal KG.

In some embodiments, as shown in FIGS. 18, 19 and 20, the signal latch circuit 211 includes a fourth capacitor C4. A first electrode of the fourth capacitor C4 is coupled to the fourth node N4 and the fifth node N5, and a second electrode of the fourth capacitor C4 is coupled to a third voltage signal terminal VSS3.

In some examples, the control gate signal terminal KG receives the control gate signal, and the enable control transistor T12 is turned on under control of the control gate signal. Thus, the first control data signal received at the control data signal terminal KD is transmitted to the fifth node N5 and the fourth node N4. The second control transistor T7 is turned on under control of the first control data signal, and transmits the signal at the second enable signal terminal EM2 to the enable signal control terminal EK; the first control transistor T6 is turned off under control of the first control data signal.

Alternatively, the control gate signal terminal KG receives the control gate signal, and the enable control transistor T12 is turned on under control of the control gate signal. Thus, the second control data signal received at the control data signal terminal KD is transmitted to the fifth node N5 and the fourth node N4. The second control transistor T7 is turned off under control of the second control data signal; the first control transistor T6 is turned on under control of the first control data signal, and transmits the signal at the first enable signal terminal EM1 to the enable signal control terminal EK.

In some examples, no control gate signal is received at the control gate signal terminal KG, and the voltage at the control gate signal terminal KG is at a low level, and thus the enable control transistor T12 is turned off. That is, voltages at the fourth node N4 and the fifth node N5 are determined by a voltage of an electrical signal stored in the signal latch circuit 211.

In some other embodiments, as shown in FIGS. 21, 22 and 23, the signal latch circuit 211 includes: a first latch transistor T13, a second latch transistor T14, a third latch transistor T15 and a fourth latch transistor T16. Conduction types of the first latch transistor T13 and the fourth latch transistor T16 are opposite to conduction types of the second latch transistor T14 and the third latch transistor T15.

A first electrode of the first latch transistor T13 is coupled to a fourth voltage signal terminal VDD4, a second electrode of the first latch transistor T13 is coupled to the fifth node N5, and a control electrode of the first latch transistor T13 is coupled to the fourth node N4. A first electrode of the second latch transistor T14 is coupled to the fifth node N5, a second electrode of the second latch transistor T14 is coupled to a sixth node N6; a first electrode of the third latch transistor T15 is coupled to the sixth node N6, and the sixth node N6 is further coupled to a sixth voltage signal terminal VSS6. A control electrode of the second latch transistor T14 is coupled to the fourth node N4. A second electrode of the third latch transistor T15 is coupled to the fourth node N4, and a control electrode of the third latch transistor T15 is coupled to the fifth node N5. A first electrode of the fourth latch transistor T16 is coupled to the fourth node N4, a second electrode of the fourth latch transistor T16 is coupled to a fifth voltage signal terminal VDD5, and a control electrode of the fourth latch transistor T16 is coupled to the fifth node N5.

When the voltage at the fifth node N5 is at the high level, the third latch transistor T15 is turned on, and transmits a high-level signal received at the sixth voltage signal terminal VSS6 to the fourth node N4. When the voltage at the fifth node N5 is at the low level, the fourth latch transistor T16 is turned on, and transmits a low-level signal received at the fifth voltage signal terminal VDD5 to the fourth node N4.

Figure 29:
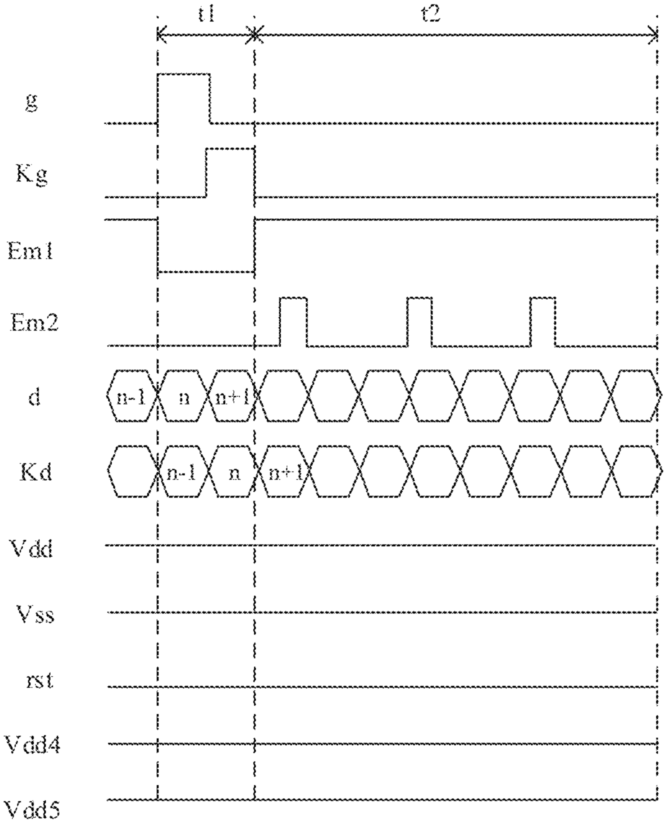
FIG. 29 is a timing diagram suitable for an operation of a fifth-type pixel driving circuit provided in some embodiments of the present disclosure.

In some examples, as shown in FIGS. 22 and 29, FIG. 29 shows a timing diagram of the pixel driving circuit in FIG. 22.

In a reset and data writing phase t1, the voltage of the scan signal g received at the scan signal terminal G is at a high level, and the voltage of the control gate signal Kg received at the control gate signal terminal KG is at a low level, the writing transistor T3, the first reset transistor T4 and the second reset transistor T5 are all in turned-on states, voltages at the first electrode of the first capacitor C1 and the first electrode of the element Q to be driven are initialized to be a voltage of the reset signal rst, and the data signal d is written into the second node N2.

In a data writing phase, the voltage of the control gate signal Kg received at the control gate signal terminal KG is at a high level, and thus the control data signal Kd received at the control data signal terminal KD is latched by the signal latch circuit. When the gray scale is high, the voltage at the control data signal terminal KD is at a low level, and thus the first control transistor T6 is turned on when the gray scale is high. When the gray scale is low, the voltage at the control data signal terminal KD is at a high level, and thus the second control transistor T7 is turned on when the gray scale is low.

In a light-emitting phase t2, after a balancing process of the driving transistor T1 and the element Q to be driven, the voltage of the reset signal rst received at the second electrode of the enable transistor T2 from the reset signal terminal is raised to a certain voltage (which is different from a gray scale voltage), a voltage at the control electrode of the driving transistor T1 is bootstrapped to a threshold voltage, and thus the element Q to be driven starts to receive the driving signal and act.

When the gray scale is high, the control data signal terminal KD transmits the second control data signal, the voltage at the fifth node N5 is at a low level, and thus the second control transistor T7 is turned off; the voltage at the fourth node N4 is at a low level, and thus the enable transistor T6 is turned on. As a result, the control electrode of the enable transistor T2 is controlled to be turned on by the first enable signal received at the first enable signal terminal EM1.

When the gray scale is low, the control data signal terminal KD transmits the first control data signal, the voltage at the fifth node N is at a high level, and thus the second control transistor T7 is turned on; the voltage at the fourth node N is at a high level, and thus the enable transistor T6 is turned off. As a result, the control electrode of the enable transistor T2 is controlled to be turned on by the second enable signal received at the second enable signal terminal EM2.

The first latch transistor T13 and the second latch transistor T14 may be turned on or off under control of the voltage at the fourth node N4, and the signal latch circuit 211 may control a holding time of the voltage at the fifth node N5. That is, the signal latch circuit 211 may control a time of the light-emitting phase in each frame of image.

Since an orthographic projection of a transistor on the substrate is relatively small, by using the signal latch circuit, it may be possible to reduce an area occupied by the pixel driving circuit and increase the pixel density of the display panel.

It will be noted that, transistors of the control sub-circuit are all fabricated on the silicon substrate. That is, the control sub-circuit has same advantages as the transistors in the pixel driving circuit. Thus, an area of the control sub-circuit may be greatly reduced, which helps significantly increase the pixel density of the display panel.

In some embodiments, a duty ratio of the second enable signal is in a range of 0.2% to 100%, inclusive. The duty ratio of the second enable signal being less than 0.2% may cause the Mini LED or the Micro LED to emit light abnormally.

In another aspect, some embodiments of the present disclosure provide the display panel. The display panel includes element(s) to be driven and the driving sub-circuit as described in any one embodiments above. The element to be driven is coupled to the pixel driving circuit.

For example, the display panel includes the substrate, and the substrate may be the silicon substrate. A plurality of pixel driving circuits are arranged in an array and on the silicon substrate, a plurality of elements to be driven are arranged in an array and on a side of the plurality of pixel driving circuits away from the substrate, and each pixel driving circuit is coupled to a corresponding element to be driven. For example, elements to be driven are Mini LEDs or Micro LEDs.

The display panel in the embodiments of the present disclosure adopts the pixel driving circuit provided in the embodiments above, and thus the display panel has same effects and advantages as the pixel driving circuit, which will not be repeated here.

Figure 24:
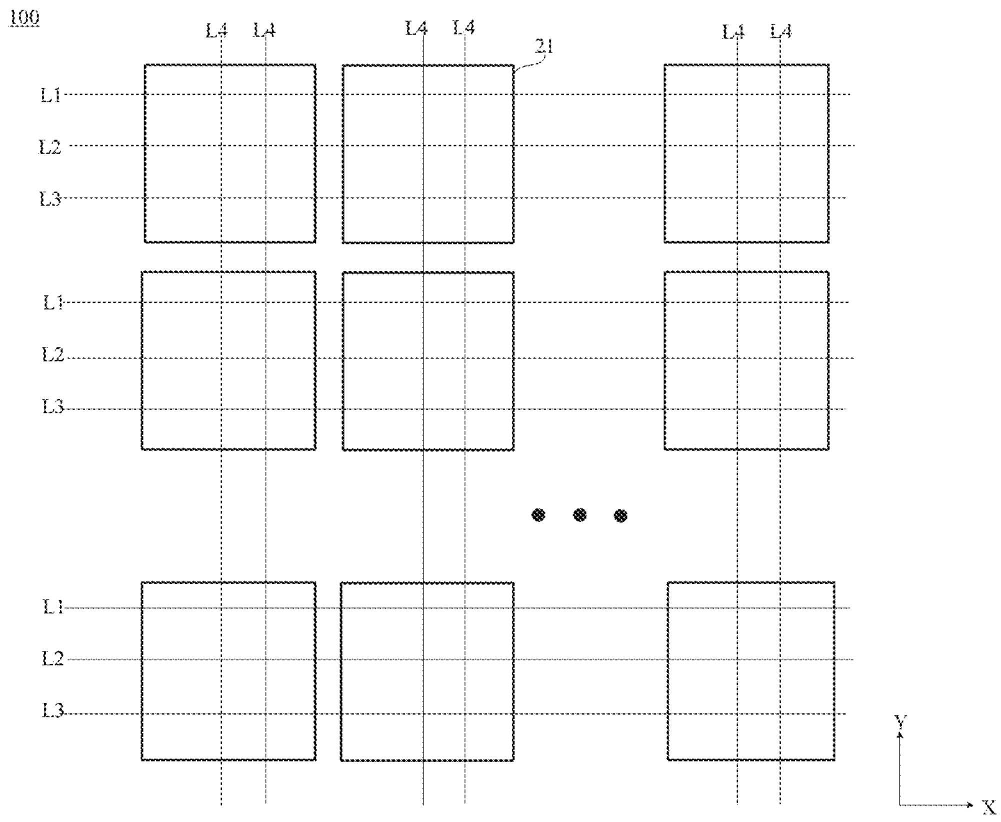
FIG. 24 is a structural diagram of another display panel provided in some embodiments of the present disclosure.

In some embodiments, as shown in FIG. 24, and in combination with FIG. 12, the display panel 100 includes a plurality of sub-pixels arranged in an array, and each sub-pixel includes a pixel driving circuit 21 and a light-emitting device. The plurality of pixel driving circuits 21 are arranged in an array. Each pixel driving circuit 21 includes the first enable control sub-circuit 29 and the second enable control sub-circuit 210. The first enable control sub-circuit 29 is coupled to the first control signal terminal CK1 and the first control data signal terminal KD1, and the second enable control sub-circuit 210 is coupled to the second control signal terminal CK2 and the second control data signal terminal KD2.

The display panel 100 further includes: a plurality of first signal lines L1, a plurality of second signal lines L2, a plurality of third signal lines L3 and a plurality of fourth signal lines L4.

The plurality of first signal lines L1 may be first enable signal lines, the plurality of first signal lines L1 each are arranged along a row direction X of the pixel driving circuits 21 that are arranged in the array. First enable signal terminals in a row of pixel driving circuits 21 are coupled to a first signal line L1 in the plurality of first signal lines L1, and the first signal line L1 may be configured to transmit the first enable signal to the pixel driving circuit 21.

The plurality of second signal lines L2 may be second enable signal lines, and the plurality of second signal lines L2 each are arranged along the row direction X of the pixel driving circuits 21 that are arranged in the array. Second enable signal terminals in a row of pixel driving circuits 21 are coupled to a second signal line L2 in the plurality of second signal lines L2, and the second signal line L2 may be configured to transmit the second enable signal to the pixel driving circuits 21.

The plurality of third signal lines L3 may be control signal lines, and the plurality of third signal lines L3 each are arranged along the row direction X of the pixel driving circuits 21 that are arranged in the array. First control signal terminals and second control signal terminals in the row of pixel driving circuits 21 are coupled to a third signal line L3 in the plurality of third signal lines L3.

The plurality of fourth signal lines L4 may be first control data signal lines, and the plurality of fourth signal lines L4 may each be arranged along a column direction Y of the pixel driving circuits 21 that are arranged in the array. First control data signal terminals and second control data signal terminals in a column of pixel driving circuits 21 each are coupled to a fourth signal line L4 in the plurality of fourth signal lines L4.

For example, the display panel includes the plurality of first signal lines L1 and the plurality of second signal lines L2; the plurality of first signal lines L1 and the plurality of second signal lines L2 each are arranged along the row direction X of the pixel driving circuits 21 that are arranged in the array. Each first signal line L1 passes by a row of pixel driving circuits 21, and each second signal line L2 passes by a row of pixel driving circuits 21. A first signal line L1 is coupled to a first enable signal terminal of each pixel driving circuit 21 in a row of pixel driving circuits 21 that the first signal line L1 passes by, and the first signal line L1 is configured to transmit the first enable signal to the pixel driving circuit 21. A second signal line L2 is coupled to a second enable signal terminal of each pixel driving circuit 21 in a row of pixel driving circuits 21 that the second signal line L2 passes by, and the second signal line L2 is configured to transmit the second enable signal to the pixel driving circuit 21.

In some examples, the display panel further includes the plurality of third signal lines L3, each third signal line L3 in the plurality of third signal lines L3 passes by a row of pixel driving circuits 21, a first control signal terminal and a second control signal terminal of each pixel driving circuit 21 in a row of pixel driving circuits 21 are coupled to the same third signal line L3. For example, an electrical signal transmitted by the third signal line L3 is a high-level signal. As a result, the first enable control sub-circuit transmits the first control data signal to the first enable sub-circuit under control of the received electrical signal transmitted by the third signal line L3, or the second enable control sub-circuit transmits the second control data signal to the second enable sub-circuit under control of the received electrical signal transmitted by the third signal line L3. The driving sub-circuit is turned on under control of an electrical signal received by the first enable sub-circuit or the second enable sub-circuit, and thus the light-emitting device emits light.

The display panel further includes the plurality of fourth signal lines L4; every two fourth signal lines L4 in the plurality of fourth signal lines L4 pass by a column of pixel driving circuits 21, and a first control data signal terminal of each pixel driving circuit 21 in a column of pixel driving circuits 21 is coupled to a first fourth signal line L4 passing by the column of pixel driving circuits 21, and a second control data signal terminal of each pixel driving circuit 21 in the column of pixel driving circuits 21 is coupled to a second fourth signal line L4 passing by the column of pixel driving circuits 21. That is, under control of the received electrical signal transmitted by the third signal line L3, the first enable control sub-circuit transmits the electrical signal transmitted by the first fourth signal line L4 to the first enable sub-circuit, and the electrical signal transmitted by the first fourth signal line L4 may be at a high level or a low level; under control of the received electrical signal transmitted by the third signal line L3, the second enable control sub-circuit transmits the electrical signal transmitted by the second fourth signal line L4 to the second enable sub-circuit, and the electrical signal transmitted by the second fourth signal line L4 may be at a high level or a low level.

Figure 25:
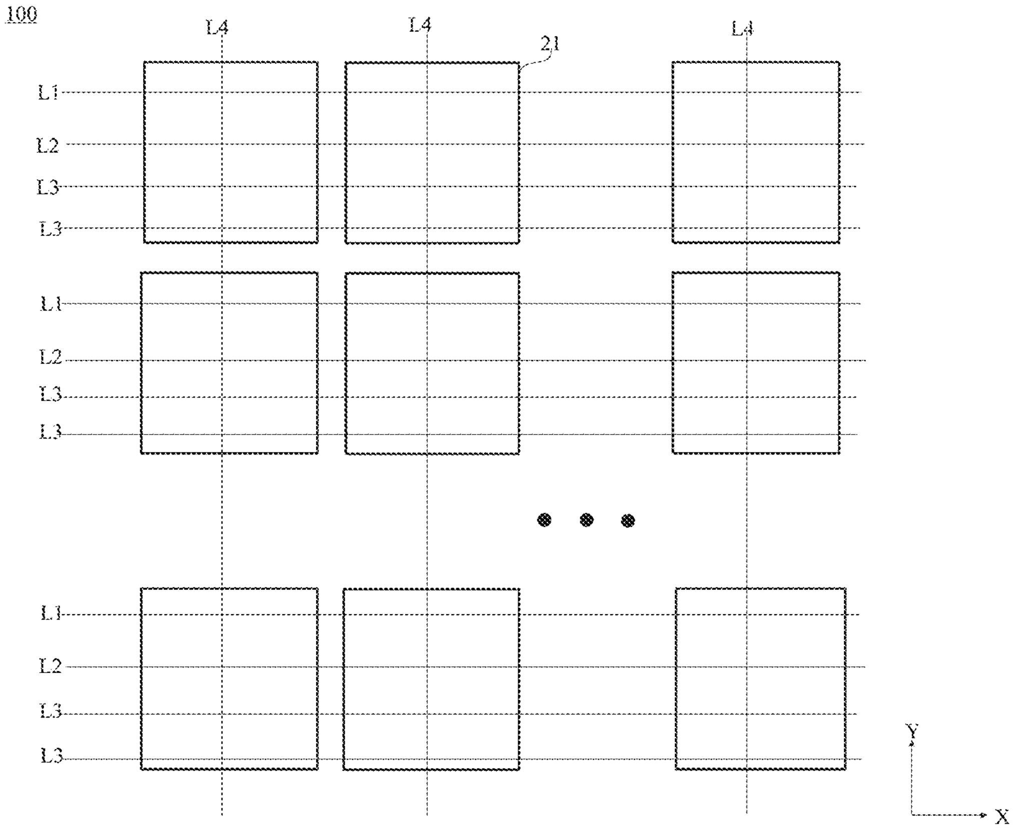
FIG. 25 is another structural diagram of another display panel provided in some embodiments of the present disclosure.

In some other embodiments, as shown in FIG. 25, the display panel further includes a plurality of first signal lines L1, a plurality of second signal lines L2, a plurality of third signal lines L3 and a plurality of fourth signal lines L4. Arrangements of the plurality of first signal lines L1 and the plurality of second signal lines L2 are the same as the arrangements of the plurality of first signal lines L1 and the plurality of second signal lines L2 described in the embodiments above, and connection relationships of the plurality of first signal lines L1 and the plurality of second signal lines L2 are the same as connection relationships of the plurality of first signal lines L1 and the plurality of second signal lines L2 described in the embodiments above, which will not be repeated here.

The plurality of third signal lines L3 may be control signal lines, and the plurality of third signal lines L3 each are arranged along the row direction X of the pixel driving circuits 21 that are arranged in the array. First control signal terminals and second control signal terminals in a row of pixel driving circuits 21 each are coupled to a third signal line L3 in the plurality of third signal lines L3.

The plurality of fourth signal lines L4 may be first control data signal lines, and the plurality of fourth signal lines L4 may each be arranged along the column direction Y of the pixel driving circuits 21 that are arranged in the array. First control data signal terminals and second control data signal terminals in a column of pixel driving circuits 21 are coupled to a fourth signal line L4 in the plurality of fourth signal lines L4.

In some examples, the display panel further includes the plurality of third signal lines L3; every two third signal lines L3 in the plurality of third signal lines L3 pass by a row of pixel driving circuits 21, and the first control signal terminals in the row of pixel driving circuits 21 are coupled to a first third signal line L3, and the second control signal terminals in the row of pixel driving circuits 21 are coupled to a second third signal line L3. For example, under control of the electrical signal transmitted by the first third signal line L3, the first enable control sub-circuit transmits the electrical signal received at the first control data signal terminal to the first enable sub-circuit; under control of the electrical signal transmitted by the second third signal line L3, the second enable sub-control circuit transmits the electrical signal received at the second control data signal terminal to the second enable sub-circuit.

The display panel further includes the plurality of fourth signal lines L4, each fourth signal line L4 in the plurality of fourth signal lines L4 passes by a column of pixel driving circuits 21, and a control data signal terminal and a second control data signal terminal of each first pixel driving circuit 21 in a column of pixel driving circuits 21 are coupled to a fourth signal line L4 passing by the column of pixel driving circuits 21. That is, under control of the electrical signal transmitted by the first third signal line L3, the first enable control sub-circuit transmits the electrical signal transmitted by the fourth signal line L4 to the first enable sub-circuit, and the electrical signal transmitted by the fourth signal line L4 may be at a high level; under control of the electrical signal transmitted by the second third signal line L3, the second enable control sub-circuit transmits the electrical signal transmitted by the fourth signal line L4 to the second enable sub-circuit.

Figure 26:
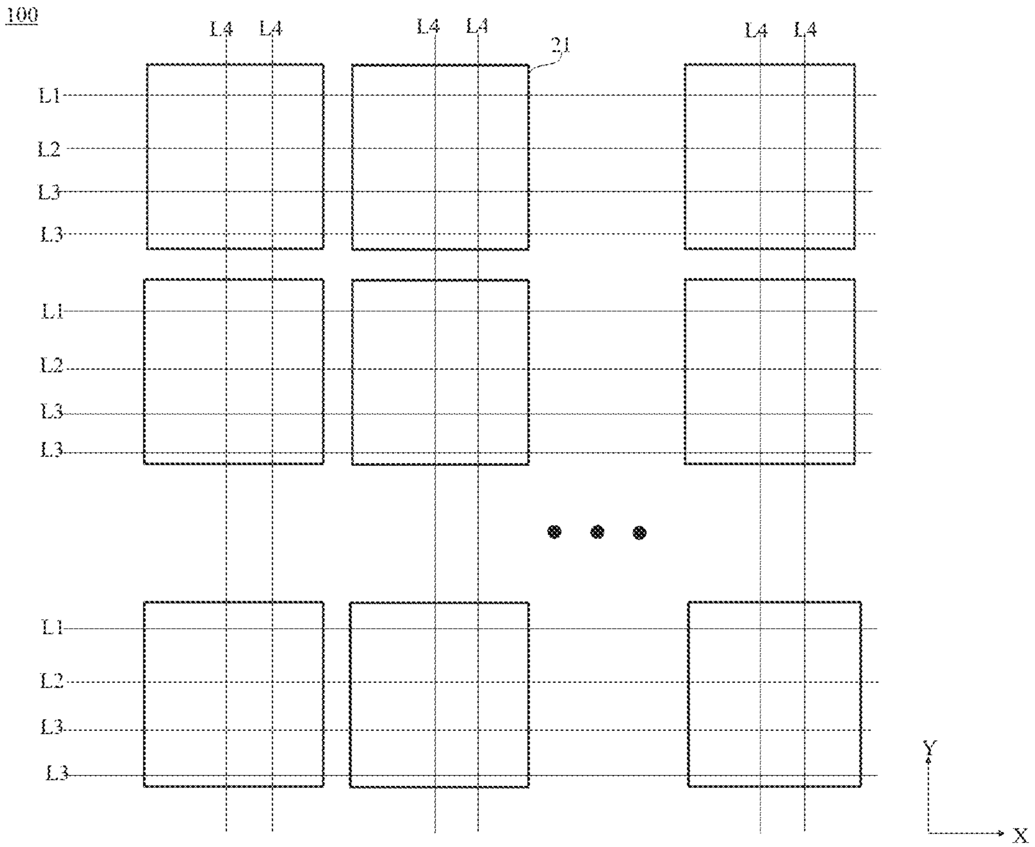
FIG. 26 is yet another structural diagram of another display panel provided in some embodiments of the present disclosure.

In still other embodiments, as shown in FIG. 26, the display panel further includes: a plurality of first signal lines L1, a plurality of second signal lines L2, a plurality of third signal lines L3 and a plurality of fourth signal lines L4. Arrangements of the plurality of first signal lines L1 and the plurality of second signal lines L2 are the same as the arrangements of the plurality of first signal lines L1 and the plurality of second signal lines L2 described in the embodiments above, and connection relationships of the plurality of first signal lines L1 and the plurality of second signal lines L2 are the same as the connection relationships of the plurality of first signal lines L1 and the plurality of second signal lines L2 described in the embodiments above, which will not be repeated here.

The plurality of third signal lines L3 may be control signal lines, and the plurality of third signal lines L3 each are arranged along the row direction X of the pixel driving circuits 21 that are arranged in the array. First control signal terminals and second control signal terminals in a row of pixel driving circuits 21 are coupled to a third signal line L3 in the plurality of third signal lines L3.

The plurality of fourth signal lines L4 may be first control data signal lines, and the plurality of fourth signal lines L4 may each be arranged along the column direction Y of the pixel driving circuits 21 that are arranged in the array. First control data signal terminals and second control data signal terminals in a column of pixel driving circuits 21 each are coupled to a fourth signal line L4 in the plurality of fourth signal lines L4.

In some examples, the display panel further includes the plurality of third signal lines L3; every two third signal lines L3 in the plurality of third signal lines L3 pass by a row of pixel driving circuits 21, and the first control signal terminals in the row of pixel driving circuits 21 are coupled to a first third signal line L3, and the second control signal terminals in the row of pixel driving circuits 21 are coupled to a second third signal line L3. For example, under control of the electrical signal transmitted by the first third signal line L3, the first enable control sub-circuit transmits the electrical signal received at the first control data signal terminal to the first enable sub-circuit; under control of the electrical signal transmitted by the second third signal line L3, the second enable sub-control circuit transmits the electrical signal received at the second control data signal terminal to the second enable sub-circuit.

The display panel further includes the plurality of fourth signal lines L4, every two fourth signal lines L4 in the plurality of fourth signal lines L4 pass by a column of pixel driving circuits 21, and a first control data signal terminal of each pixel driving circuit 21 in a column of pixel driving circuits 21 is coupled to a first fourth signal line L4 passing by the column of pixel driving circuits 21, and a second control data signal terminal of each pixel driving circuit 21 in the column of pixel driving circuits 21 is coupled to a second fourth signal line L4 passing by the column of pixel driving circuits 21. That is, under control of the received electrical signal transmitted by the third signal line L3, the first enable control sub-circuit transmits the electrical signal transmitted by the first fourth signal line L4 to the first enable sub-circuit, and the electrical signal transmitted by the first fourth signal line L4 may be at a high level or a low level; under control of the received electrical signal transmitted by the third signal line L3, the second enable control sub-circuit transmits the electrical signal transmitted by the second fourth signal line L4 to the second enable sub-circuit, and the electrical signal transmitted by the second fourth signal line L4 may be at a high level or a low level.

Figure 27:
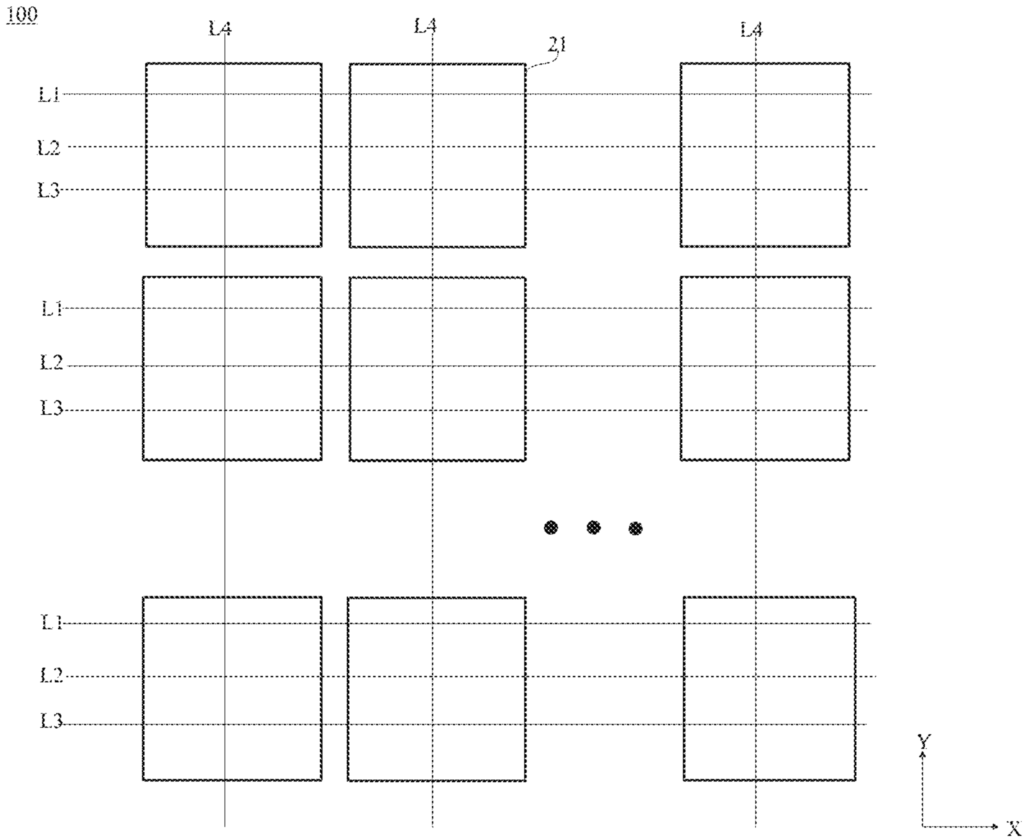
FIG. 27 is yet another structural diagram of another display panel provided in some embodiments of the present disclosure.

In some embodiments, as shown in FIG. 27, and in combination with FIG. 17, the pixel driving circuit 21 includes the enable control sub-circuit 212, the enable control sub-circuit 212 is coupled to the control gate signal terminal KG and the control data signal terminal KD. The pixel driving circuit 21 further includes the signal latch sub-circuit 211 and the second enable sub-circuit 28, the enable control sub-circuit 212 is coupled to the signal latch sub-circuit 211 and the second enable sub-circuit 28.

The display panel further includes: a plurality of first signal lines L1, a plurality of second signal lines L2, a plurality of third signal lines L3 and a plurality of fourth signal lines L4. Arrangements of the plurality of first signal lines L1 and the plurality of second signal lines L2 are the same as the arrangements of the plurality of first signal lines L1 and the plurality of second signal lines L2 described in the embodiments above, and connection relationships of the plurality of first signal lines L1 and the plurality of second signal lines L2 are the same as the connection relationships of the plurality of first signal lines L1 and the plurality of second signal lines L2 described in the embodiments above, which will not be repeated here.

The plurality of third signal lines L3 may be control data signal lines, and control data signal terminals in a row of pixel driving circuits 21 are coupled to a third signal line L3 in the plurality of third signal lines L3. The plurality of fourth signal lines L4 may be control gate signal lines, and control gate signal terminals in a column of pixel driving circuits 21 are coupled to a fourth signal line L4 in the plurality of fourth signal lines L4.

For example, the plurality of third signal lines L3 each are arranged along the row direction X of the pixel driving circuits 21 that are arranged in the array, each third signal line L3 passes by a row of pixel driving circuits 21, and the control data signal terminals in the row of pixel driving circuits 21 are coupled to a third signal line L3 passing by the row of pixel driving circuits 21. The plurality of fourth signal lines L4 each are arranged along the column direction Y of the pixel driving circuits 21 that are arranged in the array, each fourth signal line L4 passes by a column of pixel driving circuits 21, and the control data signal terminals in the column of pixel driving circuits 21 are coupled to a fourth signal line L4 passing by the column of pixel driving circuits 21. Under control of the control gate signal transmitted by the fourth signal line L4, the enable control sub-circuit transmits the control data signal transmitted by the third signal line L3 to the latch sub-circuit and the second enable sub-circuit. The latch sub-circuit transmits a signal to the first enable sub-circuit under control of the control data signal, and a potential of the signal is opposite to a potential of the control data signal. That is, in a case where the signal transmitted to the first enable sub-circuit is a high-level signal, the control data signal is a low-level signal; or in a case where the signal transmitted to the first enable sub-circuit is a low-level signal, the control data signal is a high-level signal.

The third signal lines and the fourth signal lines may be arranged differently according to requirements of the display panel. In the case where the plurality of pixel driving circuits are arranged in the array, the number of signal lines coupled to each row of pixel driving circuits may be reduced, so that the display panel may have a relatively looser wiring space. As a result, it facilitates the display panel achieving a relatively high resolution.

In some embodiments, the display panel further includes a plurality of shift register circuits that are cascaded, each shift register circuit is coupled to second enable signal terminals in a row of the pixel driving circuits; the shift register circuit is configured to transmit the second enable signal to the second enable signal terminal of the pixel driving circuit coupled thereto.

In some examples, referring to the pixel driving circuit 21 in FIG. 23, and in combination with the timing diagram of the pixel driving circuit 21 shown in FIG. 29, it will be known that, the second enable signal is a pulse signal; in a phase when the element to be driven does not work, the voltage at the control electrode of the enable transistor T2 is alternately at a high voltage and a low voltage, so that voltages at the first electrode of the enable transistor T2 and the second electrode of the driving transistor T1 float, which affects the accuracy of the written data signal. Therefore, for each pixel driving circuit in a row of pixel driving circuits 21, in the case where the driving sub-circuit 22 receives the second enable signal from the second enable sub-circuit 28, the driving sub-circuit 22 is in a turned-off state in response to the electrical signal at the second node N2, and thus the driving sub-circuit 22 is in the turned-off state in response to the second enable signal at the same time. In this way, the influence of the second enable signal on the driving sub-circuit may be avoided.

In yet another aspect, some embodiments of the present disclosure provide a display apparatus. The display apparatus includes a driver chip and the display panel provided in the embodiments above. The driver chip is coupled to the display panel, and the driver chip is configured to provide signals to the display panel.

The display apparatus 1000 may be any apparatus that displays an image whether in motion (e.g., a video) or stationary (e.g., a still image), and whether literal or graphical. More specifically, it is anticipated that the embodiments may be implemented in or associated with a variety of electronic devices. The variety of electronic devices include (but is not limit to), for example, mobile telephones, wireless devices, personal data assistants (PDAs), hand-held or portable computers, global positioning system (GPS) receivers/navigators, cameras, MPEG-4 Part 14 (MP4) video players, video cameras, game consoles, watches, clocks, calculators, television monitors, flat panel displays, computer monitors, automobile displays (e.g., odometer displays), navigators, cockpit controllers and/or displays, camera view displays (e.g., rear view camera displays in a vehicle), electronic photos, electronic billboards or signages, projectors, architectural structures, packaging and aesthetic structures (e.g., displays for displaying an image of a piece of jewelry).

The display apparatus provided in the embodiments of the present disclosure adopts the display panel provided in the embodiments above, and the display apparatus has same effects and advantages as the display panel, which will not be repeated here.

In yet another aspect, some embodiments of the present disclosure provide a driving method of a pixel driving circuit. It will be noted that the driving method of the pixel driving circuit is applicable to the pixel driving circuit described above. Referring to FIG. 23, the pixel driving circuit includes a driving sub-circuit 22 and a control sub-circuit 26. The driving sub-circuit 22 is coupled to an enable signal control terminal EK and the element to be driven, and the driving sub-circuit 22 is configured to, in response to an enable signal received at the enable signal control terminal EK, transmit a generated driving signal to the element to be driven, and control a current path through which the driving signal is transmitted to the element to be driven to be turned on and off. The control sub-circuit 26 is coupled to the enable signal control terminal EK, and the control sub-circuit 26 is configured to transmit a first enable signal or a second enable signal to the enable signal control terminal EK.

Figure 28:
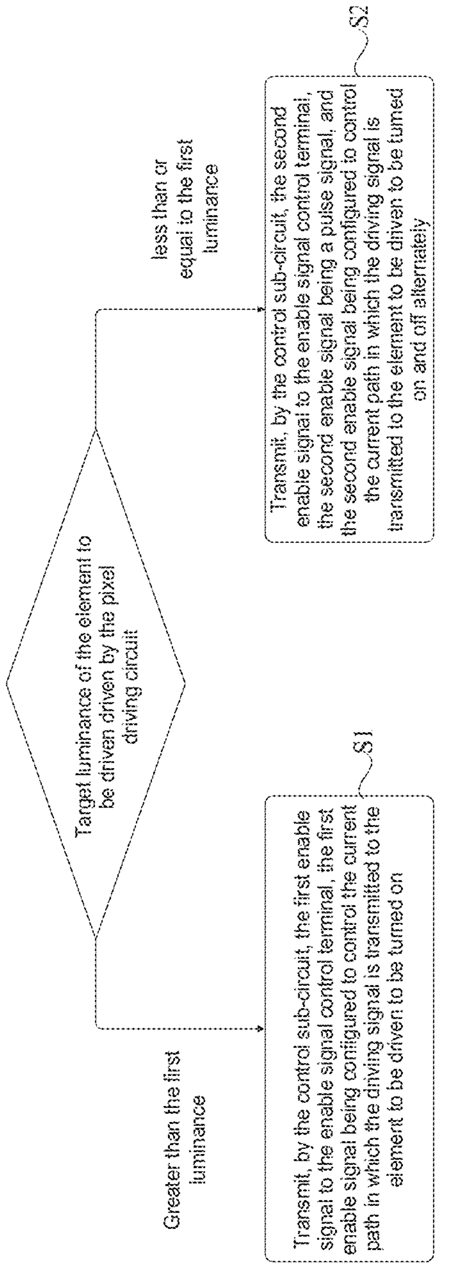
FIG. 28 is a flowchart of a driving method of a pixel driving circuit provided in some embodiments of the present disclosure.

As shown in FIG. 28, the driving method of the pixel driving circuit is as follows.

In S1, when target luminance of the element to be driven driven by the pixel driving circuit is greater than first luminance, the control sub-circuit transmits the first enable signal to the enable signal control terminal EK, and the first enable signal is configured to control the current path through which the driving signal is transmitted to the element to be driven to be turned on.

In S2, when the target luminance of the element to be driven driven by the pixel driving circuit is less than or equal to the first luminance, the control sub-circuit transmits the second enable signal to the enable signal control terminal EK; the second enable signal is a pulse signal, and the second enable signal is configured to control the current path through which the driving signal is transmitted to the element to be driven to be turned on and off alternately.

In some examples, the first luminance may be a certain gray scale of a sub-pixel. Under a condition where luminance of a Mini LED or a Micro LED is lower than the first luminance, a main peak of the Mini LED or the Micro LED offsets due to the change of the current density. The first luminance may be set according to the specific characteristics of the Mini LED or the Micro LED.

For example, the element to be driven is the Mini LED or the Micro LED.

When luminance of the sub-pixel corresponding to a next frame of image is higher than the first luminance, the control sub-circuit of the pixel driving circuit corresponding to the sub-pixel transmits the first enable signal to the enable signal control terminal EK, and the first enable signal may control the current path through which the driving signal is transmitted to the Mini LED or the Micro LED to be turned on.

When the luminance of the sub-pixel corresponding to the next frame of image is lower than or equal to the first luminance, the control sub-circuit of the pixel driving circuit corresponding to the sub-pixel transmits the second enable signal to the enable signal control terminal EK; the second enable signal is the pulse signal, which may control the current path through which the driving signal transmitted to the Mini LED or the Micro LED to be turned on and off alternately, so that the corresponding sub-pixel may alternately emit light and go out in one frame of image. For the Mini LED or the Micro LED corresponding to the sub-pixel, when the current density of the driving signal is relatively large, the gray scale of the sub-pixel in the frame of image is relatively low, which may avoid the main peak of the Mini LED or the Micro LED from drifting with the change of the current density, thereby improving the brightness uniformity of the display panel.

In yet another aspect, some embodiments of the present disclosure provide a computer-readable storage medium (e.g., a non-transitory computer-readable storage medium), the computer-readable storage medium has stored therein computer program instructions that, when run on a computer, cause the computer to execute the driving method of the pixel driving circuit in any of the embodiments above.

For example, the computer-readable storage medium may include, but is not limited to a magnetic storage device (e.g., a hard disk, a floppy disk or a magnetic tape), an optical disk (e.g., a compact disk (CD), a digital versatile disk (DVD)), a smart card and a flash memory device (e.g., an erasable programmable read-only memory (EPROM), a card, a stick or a key driver). Various computer-readable storage medium described in the present disclosure may represent one or more devices and/or other machine-readable storage media for storing information. The term "machine-readable storage medium" may include, but is not limited to, wireless channels and various other media capable of storing, containing and/or carrying instructions and/or data.

In yet another aspect, some embodiments of the present disclosure provide a computer program product. For example, the computer program product is stored on the non-transitory computer-readable storage medium. The computer program product includes computer programs that, when executed on a computer, cause the computer to execute the driving method of the pixel driving circuit as described in the embodiments above.

In yet another aspect, some embodiments of the present disclosure provide a computer program. When executed on a computer, the computer program causes the computer to execute the driving method of the pixel driving circuit as described in the embodiments above.

Beneficial effects of the computer-readable storage medium, the computer program product and the computer program are same as the beneficial effects of the driving method of the pixel driving circuit as described in some of the embodiments above, and details will not be repeated here.

The foregoing descriptions are merely specific implementation manners of the present disclosure, but the protection scope of the present disclosure is not limited thereto, any changes or replacements that a person skilled in the art could conceive of within the technical scope of the present disclosure shall be included in the protection scope of the present disclosure. Therefore, the protection scope of the present disclosure shall be subject to the protection scope of the claims.

What is claimed is:

1. A pixel driving circuit, comprising:

a driving sub-circuit coupled to a data signal terminal, a scan signal terminal, a first power supply voltage terminal, an enable signal control terminal and an element to be driven, the driving sub-circuit being configured to, in response to a signal received at the scan signal terminal, write a data signal received at the data signal terminal into the driving sub-circuit; and the driving sub-circuit being further configured to, generate a driving signal according to the written data signal and a first voltage signal received at the first power supply voltage terminal, and in response to an enable signal received at the enable signal control terminal, transmit the driving signal to the element to be driven, and control a current path transmitting the driving signal to be turned on and off; and a control sub-circuit coupled to a control signal terminal, a first enable signal terminal, a second enable signal terminal and the enable signal control terminal, the control sub-circuit being configured to, in response to a signal received at the control signal terminal, transmit a signal received at the first enable signal terminal to the enable signal control terminal, or transmit a signal received at the second enable signal terminal to the enable signal control terminal;

wherein the driving sub-circuit includes a data writing sub-circuit and a driving signal generating sub-circuit, wherein the data writing sub-circuit is coupled to the data signal terminal, the scan signal terminal and a second node, and the data writing sub-circuit is configured to, in response to a scan signal received at the scan signal terminal, transmit the data signal received at the data signal terminal to the second node;

the driving signal generating sub-circuit is coupled to the second node, the first power supply voltage terminal, the enable signal control terminal and the element to be driven, and the driving signal generating sub-circuit is configured to, in response to the enable signal received at the enable signal control terminal and a voltage at the second node, generate the driving signal according to the first voltage signal received at the first power supply voltage terminal; and the driving signal generating sub-circuit is further configured to, in response to the enable signal received at the enable signal control terminal, control a current path through which the driving signal is transmitted to the element to be driven to be turned on and off.

2. The pixel driving circuit according to claim 1, wherein the driving signal generating sub-circuit includes a driving transistor and an enable transistor;

a first electrode of the driving transistor is coupled to the first power supply voltage terminal, a second electrode of the driving transistor is coupled to a first node, and a control electrode of the driving transistor is coupled to the second node;

a first electrode of the enable transistor is coupled to the first node, a second electrode of the enable transistor is coupled to a third node, and a control electrode of the enable transistor is coupled to the enable signal control terminal; and the third node is further coupled to a first electrode of the element to be driven, and a second electrode of the element to be driven is coupled to a second power supply voltage terminal.

3. The pixel driving circuit according to claim 1, wherein the data writing sub-circuit includes: a writing transistor, a first capacitor and a first reset transistor;

a first electrode of the writing transistor is coupled to the data signal terminal, a second electrode of the writing transistor is coupled to the second node, and a control electrode of the writing transistor is coupled to the scan signal terminal;

a first electrode of the first reset transistor is coupled to a first node, a second electrode of the first reset transistor is coupled to a reset signal terminal, and a control electrode of the first reset transistor is coupled to the scan signal terminal; and a first electrode of the first capacitor is coupled to the first node, and a second electrode of the first capacitor is coupled to the second node.

4. The pixel driving circuit according to claim 1, wherein the data writing sub-circuit includes: a first transmission transistor, a second transmission transistor and a first capacitor, and the scan signal terminal includes a first scan signal terminal and a second scan signal terminal;

a first electrode of the first transmission transistor is coupled to the data signal terminal, a second electrode of the first transmission transistor is coupled to the second node, and a control electrode of the first transmission transistor is coupled to the first scan signal terminal;

a first electrode of the second transmission transistor is coupled to the data signal terminal, a second electrode of the second transmission transistor is coupled to the second node, and a control electrode of the second transmission transistor is coupled to the second scan signal terminal; and a first electrode of the first capacitor is coupled to the second node, and a second electrode of the first capacitor is coupled to a reference voltage terminal.

5. The pixel driving circuit according to claim 1, wherein the pixel driving circuit further comprises a reset sub-circuit coupled to a third node, the scan signal terminal and a reset signal terminal; and the reset sub-circuit is configured to, in response to the scan signal received at the scan signal terminal, transmit a reset signal received at the reset signal terminal to the third node; or the pixel driving circuit further comprises the reset sub-circuit coupled to the third node, the scan signal terminal and the reset signal terminal; the reset sub-circuit is configured to, in response to the scan signal received at the scan signal terminal, transmit the reset signal received at the reset signal terminal to the third node; and the reset sub-circuit includes a second reset transistor; a first electrode of the second reset transistor is coupled to the third node, a second electrode of the second reset transistor is coupled to the reset signal terminal, and a control electrode of the second reset transistor is coupled to the scan signal terminal.

6. The pixel driving circuit according to claim 1, wherein the control sub-circuit includes a first enable sub-circuit and a second enable sub-circuit, the first enable sub-circuit is coupled to a fourth node, the first enable signal terminal and the enable signal control terminal, and the first enable sub-circuit is configured to, in response to a first control signal received at the fourth node, transmit a first enable signal received at the first enable signal terminal to the enable signal control terminal; and the second enable sub-circuit is coupled to a fifth node, the second enable signal terminal and the enable signal control terminal, and the second enable sub-circuit is configured to, in response to a second control signal received at the fifth node, transmit a second enable signal received at the second enable signal terminal to the enable signal control terminal.

7. The pixel driving circuit according to claim 6, wherein the first enable sub-circuit includes a first control transistor; a first electrode of the first control transistor is coupled to the first enable signal terminal, a second electrode of the first control transistor is coupled to the enable signal control terminal, and a control electrode of the first control transistor is coupled to the fourth node; and the second enable sub-circuit includes a second control transistor; a first electrode of the second control transistor is coupled to the second enable signal terminal, a second electrode of the second control transistor is coupled to the enable signal control terminal, and a control electrode of the second control transistor is coupled to the fifth node.

8. The pixel driving circuit according to claim 6, wherein transistors included in the first enable sub-circuit and the second enable sub-circuit are of a same conduction type;

the control sub-circuit further includes a first enable control sub-circuit and a second enable control sub-circuit, and the control signal terminal includes a first control signal terminal and a second control signal terminal;

the first enable control sub-circuit is coupled to the fourth node, the first control signal terminal and a first control data signal terminal, and the first enable control sub-circuit is configured to, in response to a first control gate signal received at the first control signal terminal, transmit a signal received at the first control data signal terminal to the fourth node; and the second enable control sub-circuit is coupled to the fifth node, the second control signal terminal and a second control data signal terminal, and the second enable control sub-circuit is configured to, in response to a second control gate signal received at the second control signal terminal, transmit a signal received at the second control data signal terminal to the fifth node.

9. The pixel driving circuit according to claim 8, wherein the first enable control sub-circuit includes a first enable control transistor and a second capacitor; a first electrode of the first enable control transistor is coupled to the first control data signal terminal, a second electrode of the first enable control transistor is coupled to the fourth node, and a control electrode of the first enable control transistor is coupled to the first control signal terminal;

a first electrode of the second capacitor is coupled to the fourth node, and a second electrode of the second capacitor is coupled to a first voltage signal terminal;

the second enable control sub-circuit includes a second enable control transistor and a third capacitor; a first electrode of the second enable control transistor is coupled to the second control data signal terminal, a second electrode of the second enable control transistor is coupled to the fifth node, and a control electrode of the second enable control transistor is coupled to the second control signal terminal; and a first electrode of the third capacitor is coupled to the fifth node, and a second electrode of the third capacitor is coupled to a second voltage signal terminal.

10. The pixel driving circuit according to claim 6, wherein transistors included in the first enable sub-circuit and the second enable sub-circuit are of opposite conduction types;

the control sub-circuit further includes an enable control sub-circuit and a signal latch circuit; the control signal terminal is a control gate signal terminal;

the enable control sub-circuit is coupled to the control gate signal terminal, a control data signal terminal and the fifth node, and the enable control sub-circuit is configured to, in response to a control gate signal received at the control gate signal terminal, transmit a control data signal received at the control data signal terminal to the fifth node; and the signal latch circuit is coupled to the fourth node and the fifth node, and the signal latch circuit is configured to transmit the control data signal received at the control data signal terminal to the fourth nodes.

11. The pixel driving circuit according to claim 10, wherein the enable control sub-circuit includes an enable control transistor; a first electrode of the enable control transistor is coupled to the control data signal terminal, a second electrode of the enable control transistor is coupled to the fifth node and the signal latch circuit, and a control electrode of the enable control transistor is coupled to the control gate signal terminal.

12. The pixel driving circuit according to claim 10, wherein the signal latch circuit includes a fourth capacitor, a first electrode of the fourth capacitor is coupled to the fourth node and the fifth node, and a second electrode of the fourth capacitor is coupled to a third voltage signal terminal; or the signal latch circuit includes: a first latch transistor, a second latch transistor, a third latch transistor and a fourth latch transistor; conduction types of the first latch transistor and the fourth latch transistor are opposite to conduction types of the second latch transistor and the third latch transistor;

a first electrode of the first latch transistor is coupled to a fourth voltage signal terminal, a second electrode of the first latch transistor is coupled to the fifth node, and a control electrode of the first latch transistor is coupled to the fourth node;

a first electrode of the second latch transistor is coupled to the fifth node, a second electrode of the second latch transistor is coupled to a first electrode of the third latch transistor, and a control electrode of the second latch transistor is coupled to the fourth node;

a second electrode of the third latch transistor is coupled to the fourth node, and a control electrode of the third latch transistor is coupled to the fifth node; and a first electrode of the fourth latch transistor is coupled to the fourth node, a second electrode of the fourth latch transistor is coupled to a fifth voltage signal terminal, and a control electrode of the fourth latch transistor is coupled to the fifth node.

13. A display panel, comprising:

the pixel driving circuit according to claim 1; and an element to be driven, the element to be driven being coupled to the pixel driving circuit.

14. The display panel according to claim 13, wherein the control sub-circuit includes a first enable sub-circuit and a second enable sub-circuit;

the first enable sub-circuit is coupled to a fourth node, the first enable signal terminal and the enable signal control terminal, and the first enable sub-circuit is configured to, in response to a first control signal received at the fourth node, transmit a first enable signal received at the first enable signal terminal to the enable signal control terminal; and the second enable sub-circuit is coupled to a fifth node, the second enable signal terminal and the enable signal control terminal, and the second enable sub-circuit is configured to, in response to a second control signal received at the fifth node, transmit a second enable signal received at the second enable signal terminal to the enable signal control terminal;

transistors included in the first enable sub-circuit and the second enable sub-circuit are of a same conduction type; the control sub-circuit further includes a first enable control sub-circuit and a second enable control sub-circuit, and the control signal terminal includes a first control signal terminal and a second control signal terminal;

the first enable control sub-circuit is coupled to the fourth node, the first control signal terminal and the first control data signal terminal, and the first enable control sub-circuit is configured to, in response to a first control gate signal received at the first control signal terminal, transmit a signal received at the first control data signal terminal to the fourth node; and the second enable control sub-circuit is coupled to the fifth node, the second control signal terminal and the second control data signal terminal, and the second enable control sub-circuit is configured to, in response to a second control gate signal received at the second control signal terminal, transmit a signal received at the second control data signal terminal to the fifth node;

the display panel further comprises:

a plurality of first signal lines, and first enable signal terminals in a row of pixel driving circuits being coupled to a first signal line in the plurality of first signal lines;

a plurality of second signal lines, and second enable signal terminals in the row of pixel driving circuits being coupled to a second signal line in the plurality of second signal lines;

a plurality of third signal lines, first control signal terminals and second control signal terminals in the row of pixel driving circuits being coupled to a third signal line in the plurality of third signal lines, or the first control signal terminals and the second control signal terminals in the row of pixel driving circuits each being coupled to a corresponding third signal line in the plurality of third signal lines; and a plurality of fourth signal lines, and first control data signal terminals and second control data signal terminals in a column of pixel driving circuits each being coupled to a fourth signal line in the plurality of fourth signal lines.

15. The display panel according to claim 13, wherein the control sub-circuit includes a first enable sub-circuit and a second enable sub-circuit;

the first enable sub-circuit is coupled to a fourth node, the first enable signal terminal and the enable signal control terminal, and the first enable sub-circuit is configured to, in response to a first control signal received at the fourth node, transmit a first enable signal received at the first enable signal terminal to the enable signal control terminal; and the second enable sub-circuit is coupled to a fifth node, the second enable signal terminal and the enable signal control terminal, and the second enable sub-circuit is configured to, in response to a second control signal received at the fifth node, transmit a second enable signal received at the second enable signal terminal to the enable signal control terminal;

transistors included in the first enable sub-circuit and the second enable sub-circuit are of a same conduction type; the control sub-circuit further includes a first enable control sub-circuit and a second enable control sub-circuit, and the control signal terminal includes a first control signal terminal and a second control signal terminal;

the first enable control sub-circuit is coupled to the fourth node, the first control signal terminal and the first control data signal terminal, and the first enable control sub-circuit is configured to, in response to a first control gate signal received at the first control signal terminal, transmit a signal received at the first control data signal terminal to the fourth node; and the second enable control sub-circuit is coupled to the fifth node, the second control signal terminal and the second control data signal terminal, and the second enable control sub-circuit is configured to, in response to a second control gate signal received at the second control signal terminal, transmit a signal received at the second control data signal terminal to the fifth node;

the display panel further comprises:

a plurality of first signal lines, and first enable signal terminals in a row of pixel driving circuits being coupled to a first signal line in the plurality of first signal lines;

a plurality of second signal lines, and second enable signal terminals in the row of pixel driving circuits being coupled to a second signal line in the plurality of second signal lines;

a plurality of third signal lines, and first control signal terminals and second control signal terminals in the row of pixel driving circuits each being coupled to a third signal line in the plurality of third signal lines; and a plurality of fourth signal lines, first control data signal terminals and second control data signal terminals in a column of pixel driving circuits being coupled to a fourth signal line in the plurality of fourth signal lines.

16. The display panel according to claim 13, wherein the control sub-circuit includes a first enable sub-circuit and a second enable sub-circuit;

the first enable sub-circuit is coupled to a fourth node, the first enable signal terminal and the enable signal control terminal, and the first enable sub-circuit is configured to, in response to a first control signal received at the fourth node, transmit a first enable signal received at the first enable signal terminal to the enable signal control terminal; and the second enable sub-circuit is coupled to a fifth node, the second enable signal terminal and the enable signal control terminal, and the second enable sub-circuit is configured to, in response to a second control signal received at the fifth node, transmit a second enable signal received at the second enable signal terminal to the enable signal control terminal;

transistors included in the first enable sub-circuit and the second enable sub-circuit are of opposite conduction types; the control sub-circuit further includes an enable control sub-circuit and a signal latch circuit; the control signal terminal is a control gate signal terminal;

the enable control sub-circuit is coupled to the control gate signal terminal, the fifth node and the control data signal terminal, and the enable control sub-circuit is configured to, in response to a control gate signal received at the control gate signal terminal, transmit a control data signal received at the control data signal terminal to the fifth node; and the signal latch circuit is coupled to the fourth node and the fifth node, and the signal latch circuit is configured to transmit the control data signal received at the control data signal terminal to the fourth nodes; and the display panel further comprises:

a plurality of first signal lines, and first enable signal terminals in a row of pixel driving circuits being coupled to a first signal line in the plurality of first signal lines;

a plurality of second signal lines, and second enable signal terminals in the row of pixel driving circuits being coupled to a second signal line in the plurality of second signal lines;

a plurality of third signal lines, and control data signal terminals in the row of pixel driving circuits being coupled to a third signal line in the plurality of third signal lines; and a plurality of fourth signal lines, and control gate signal terminals in a column of pixel driving circuits being coupled to a fourth signal line in the plurality of fourth signal lines.

17. A display apparatus, comprising:

the display panel according to claim 13; and a driver chip, the driver chip is coupled to the display panel, and the driver chip is configured to provide signals to the display panel.

18. A driving method of a pixel driving circuit, applied to the pixel driving circuit according to claim 1, wherein the control sub-circuit is configured to transmit a first enable signal or a second enable signal to the enable signal control terminal;

the driving method of the pixel driving circuit comprises:

when target luminance of the element to be driven by the pixel driving circuit is greater than first luminance, transmitting, by the control sub-circuit, the first enable signal to the enable signal control terminal, and the first enable signal being configured to control the current path through which the driving signal is transmitted to the element to be driven to be turned on; and when the target luminance of the element to be driven by the pixel driving circuit is less than the first luminance, transmitting, by the control sub-circuit, the second enable signal to the enable signal control terminal; the second enable signal being a pulse signal, and the second enable signal being configured to control the current path through which the driving signal is transmitted to the element to be driven to be turned on and off alternately.

19. The driving method according to claim 18, wherein a duty ratio of the second enable signal is in a range of 0.2% to 100%, inclusive.

* * * * *